United States Patent
Ono et al.

(10) Patent No.: US 7,366,399 B2
(45) Date of Patent: Apr. 29, 2008

(54) INFORMATION PROCESSING APPARATUS AND INFORMATION PROCESSING METHOD, AND PROGRAM USED THEREWITH

(75) Inventors: Takaya Ono, Kanagawa (JP); Hideki Ando, Kanagawa (JP); Satoshi Katsuo, Kanagawa (JP); Takashi Furukawa, Kanagawa (JP); Hisao Tanaka, Tokyo (JP); Takayoshi Kawamura, Kanagawa (JP); Motohiro Terao, Kanagawa (JP); Masaki Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 10/699,980

(22) Filed: Nov. 3, 2003

(65) Prior Publication Data

US 2004/0091238 A1   May 13, 2004

(30) Foreign Application Priority Data

Nov. 5, 2002 (JP) ............................ P2002-320844

(51) Int. Cl.
*H04N 5/76* (2006.01)

(52) U.S. Cl. .................... 386/46; 386/95; 386/124; 386/125; 386/52; 386/55

(58) Field of Classification Search ........ 386/125–126, 386/95, 52, 55
See application file for complete search history.

(56) References Cited

U.S. PATENT DOCUMENTS

| | | | |
|---|---|---|---|
| 6,574,421 B2 * | 6/2003 | Tsumagari et al. | ............ 386/95 |
| 2005/0025450 A1 * | 2/2005 | Ono et al. | ................... 386/46 |

FOREIGN PATENT DOCUMENTS

JP    10 50037    2/1998

OTHER PUBLICATIONS

Patent Abstracts of Japan, vol. 1998, No. 14, Dec. 31, 1998 & JP 10 233059 A (Sony Corp), Sep. 2, 1998.
Patent Abstracts of Japan vol. 017, No. 235 (P-1533), May 12, 1993 & JP 04 362585 A (Fujitsu Ltd), Dec. 15, 1992.

* cited by examiner

*Primary Examiner*—Thai Q. Tran
*Assistant Examiner*—Helen Shibru
(74) *Attorney, Agent, or Firm*—Frommer Lawrence & Haug LLP; William S. Frommer; Thoams F. Presson

(57) ABSTRACT

An information processing apparatus includes a file-time-code (FTC) sort unit and a logical block number (LBN) scheduling unit. The FTC unit sorts data items recorded on an optical disk based on the playback times of the pieces of data. The LBN scheduling unit sorts the data items recorded by the FTC sort unit based on the recording positions of the data items on the optical disk. The LBN scheduling unit also uses the sorting result as the result of scheduling the order of reading the data items from the optical disk.

12 Claims, 20 Drawing Sheets

FIG. 9

| V1:Ext1 | V1:Ext2 | V1:Ext3 |
|---------|---------|---------|
| 106-115 | 122-132 | 139-147 |
| (050)   | (140)   | (180)   |

← ALLOCATION INFORMATION OF EXTENTS OF FILE V1

| A1:Ext1 | A1:Ext2 | A1:Ext3 |
|---------|---------|---------|
| 100-102 | 116-118 | 133-135 |
| (060)   | (130)   | (180)   |

← ALLOCATION INFORMATION OF EXTENTS OF FILE A1

| A2:Ext1 | A2:Ext2 | A2:Ext3 |
|---------|---------|---------|
| 103-105 | 119-121 | 136-138 |
| (060)   | (130)   | (180)   |

← ALLOCATION INFORMATION OF EXTENTS OF FILE A2

| A1:Ext1<br>100–102<br>(060) | A2:Ext1<br>103–105<br>(060) | V1:Ext1<br>106–115<br>(050) | A1:Ext2<br>116–118<br>(130) | A2:Ext2<br>119–121<br>(130) | V1:Ext2<br>122–132<br>(140) | A1:Ext3<br>133–135<br>(180) | A2:Ext3<br>136–138<br>(180) | V1:Ext3<br>139–147<br>(180) |

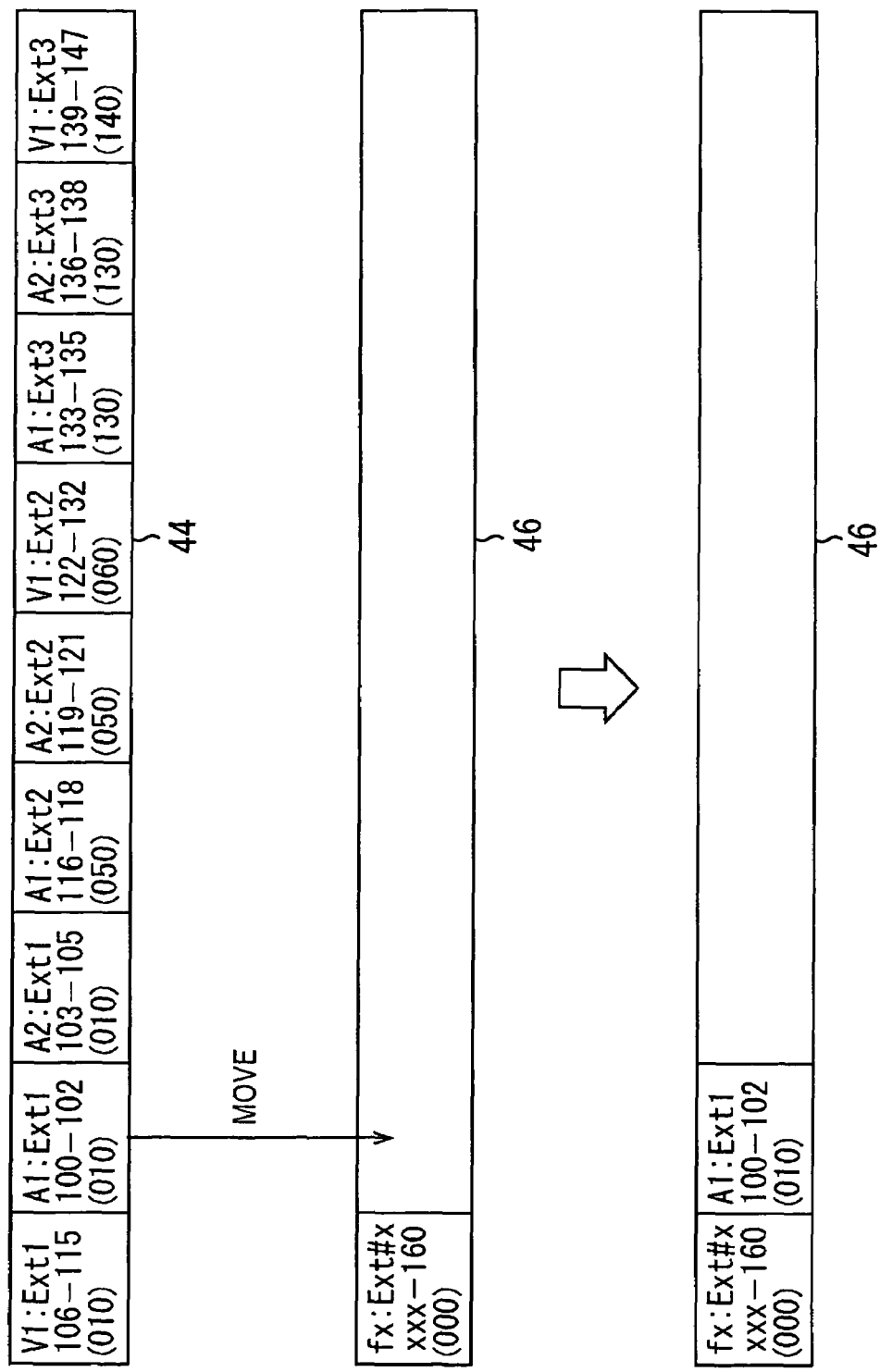

INFORMATION PROCESSING APPARATUS AND INFORMATION PROCESSING METHOD, AND PROGRAM USED THEREWITH

BACKGROUND OF THE INVENTION

1. Field of the Invention

The present invention relates to scheduling in playback order for efficient reading of data from, for example, a recording medium such as an optical disk.

2. Description of the Related Art

In recent years, optical disks and other types of recording media which have very high recording rates and reading rates have come into practical use, and it has become possible to record long-time video data with relatively high picture quality.

Even if the recording rate and reading rate of a recording medium are high, when a stream of the video data is recorded discontinuously, that is, in a form in which the stream is divided into pieces, seeking occurs in the discontinuous portions. In a case in which the seeking causes reading of the video data to be late for the time the video data must be played back, playback of the video data is interrupted.

For example, Japanese Unexamined Patent Application Publication No. 10-50037 discloses a method in which, in addition to a material data disk unit for playing back material data, a working disk unit is used. By copying, to the working disk unit, data in the vicinity of an editing point in the material data, and selectively using outputs from the material disk unit and the working disk unit, as required, playback of the material data is prevented from being interrupted due to seeking occurring at the editing point.

In the method in Japanese Unexamined Patent Application Publication No. 10-50037, in order to prevent the playback from being interrupted, the working disk unit must be used in addition to the material data disk unit, and it is required that both disk units be controlled so that their outputs are selectively used, as required.

Also, it is preferable that reading of data from a recording medium such as an optical disk can be efficiently performed.

SUMMARY OF THE INVENTION

The present invention is made in view of the above circumstances, and it is an object of the present invention to perform efficient reading of data from a recording medium such an optical disk while preventing playback of the data from being interrupted.

According to an aspect of the present invention, an information processing apparatus for scheduling order of data reading from a recording medium is provided. The information processing apparatus includes a first sorting unit for sorting data items recorded on the recording medium based on playback times of the data items, and a second sorting unit for sorting the data items sorted by the first sorting unit based on recording positions of the data items on the recording medium, and using the sorting result as a result of scheduling the order of data reading from the recording medium.

According to another aspect of the present invention, an information processing method for scheduling order of data reading from a recording medium is provided. The information processing method includes a first sorting step for sorting data items recorded on the recording medium based on playback times of the data items, and a second sorting step for sorting, based on recording positions of the data items on the recording medium, the data items sorted based on the playback times thereof in the first sorting step, and using the sorting result as a result of scheduling the order of data reading from the recording medium.

According to another aspect of the present invention, a program for causing a computer to perform an information processing method for scheduling order of data reading from a recording medium is provided. The information processing method includes a first sorting step for sorting data items recorded on the recording medium based on playback times of the data items, and a second sorting step for sorting, based on recording positions of the data items on the recording medium, the data items sorted based on the playback times thereof in the first sorting step, and using the sorting result as a result of scheduling the order of data reading from the recording medium.

According to the present invention, efficient reading of data from a recording medium can be performed while preventing playback of the data from being interrupted.

BRIEF DESCRIPTION OF THE DRAWINGS

FIG. 9 is an illustration of pieces of allocation information acquired by the allocation information acquiring process shown in FIG. 8;

FIG. 18 is an illustration of extents (of allocation information) sorted by the LNB scheduling process shown in FIG. 12;

FIG. 20 is an illustration of a state in which an extent is moved from the FTC sort result queue 44 to the scheduling result queue 46.

DESCRIPTION OF THE PREFERRED EMBODIMENTS

Figure 1:
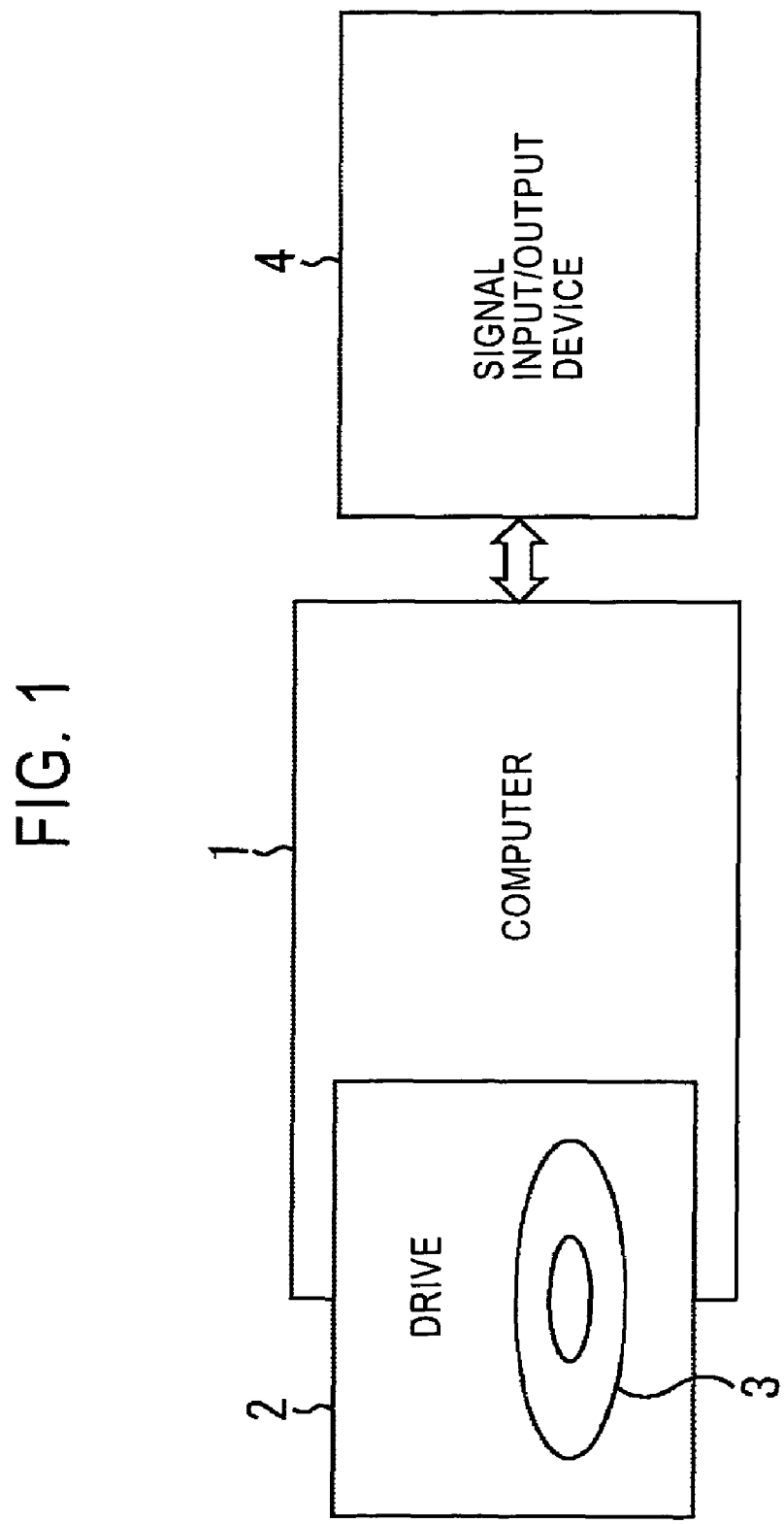
FIG. 1 is a block diagram showing an embodiment of a recording/playback system to which the present invention is applied.

FIG. 1 is a block diagram of an embodiment of a recording/playback system to which the present invention is applied.

The recording/playback system is based on a computer 1. The computer 1 has a built-in drive 2 for writing/reading data on an optical disk 3. The drive 2 is, for example; a compact-disk recordable (CD-R) drive, a CD rewritable (CD-RW) drive, or a digital-versatile-disk random-access memory (DVD-RAM) drive. The optical disk 3 can be easily loaded into the drive 2. The drive 2 is controlled by the computer 1 to record (write) data on the optical disk 3 or to read data from the optical disk 3.

In the embodiment shown in FIG. 1, audio visual (AV) data, such as audio data and picture data, is output. A signal input/output device 2 for inputting AV data to the computer 1, which includes a videocassette recorder and a television tuner, is connected as an external device to the computer 1, if necessary. The computer 1 receives the AV data output by the signal input/output device 4. The received data is supplied to the drive 2 and is recorded on the optical disk 3. The computer 1 also controls the drive 2 to read AV data on the optical disk 3 and to output the read data from a built-in display unit or speaker of the drive 2. Alternatively, the computer 1 controls, for example, the signal input/output device 4 to perform recording of the data read from the optical disk 3, etc.

Figure 2:
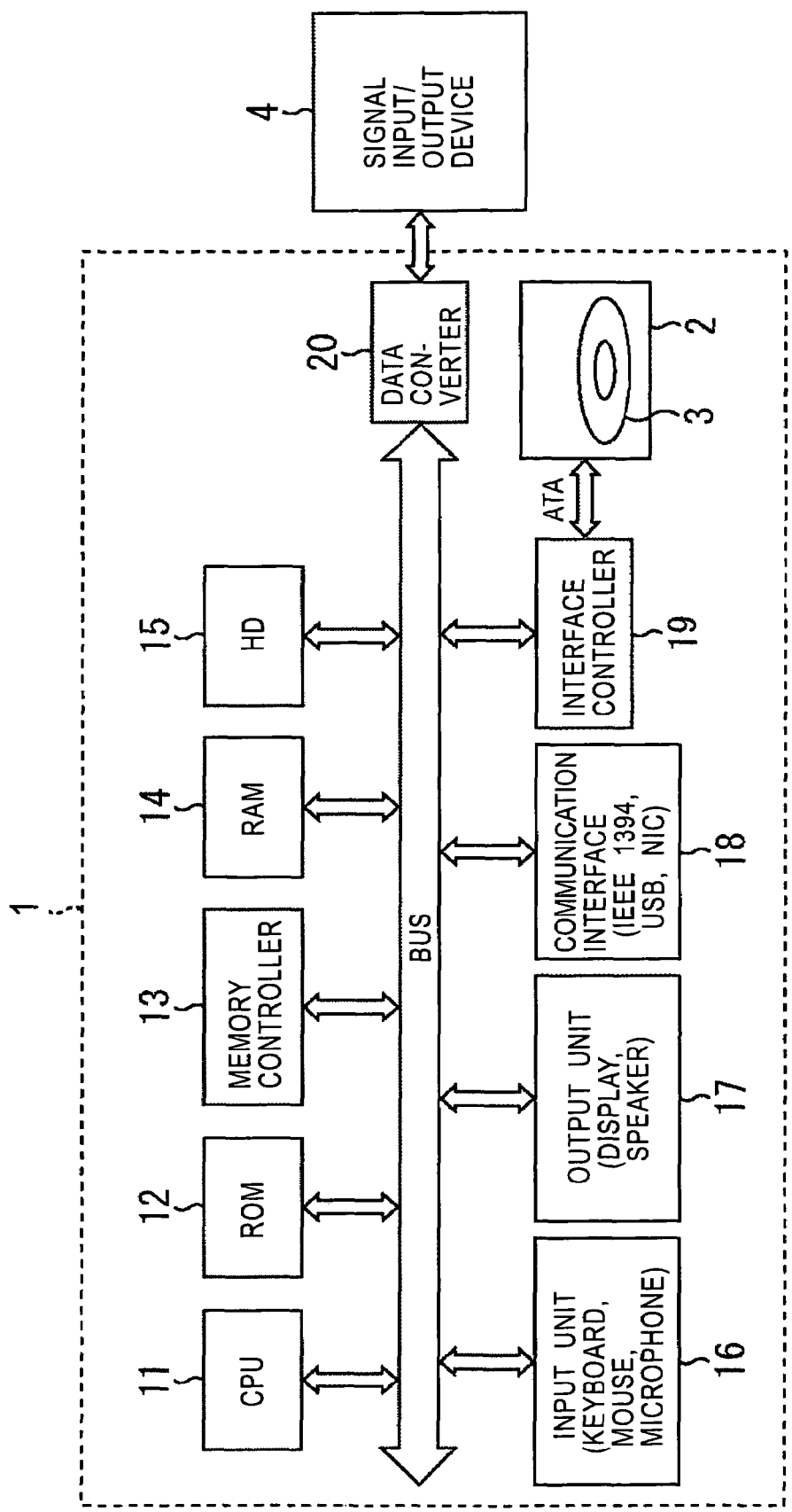
FIG. 2 is a block diagram showing the hardware of the computer 1 shown in FIG. 1.

FIG. 2 is a block diagram of the hardware of the computer 1 in FIG. 1.

For example, when a user operates an input unit 16 to input a command, a central processing unit (CPU) 11 executes a program stored in a read-only memory (ROM) 12 in response to the command. Also, the CPU 11 loads, into a random access memory (RAM) 14, a program stored in a hard disk (HD) 15, a program which is installed in the HD 15 after being transferred from a satellite or a network and being received by a communication unit 18, or a program which is installed in the HD 15 after being read from a removable recording medium such as the optical disk 3, which is loaded into the drive 2. The CPU 11 executes the loaded program.

This causes the CPU 11 to perform various types of processes in accordance with flowcharts described later.

A read-only memory (ROM) 12 stores, for example, initial program loading (IPL) and basic input output system (BIOS) programs and other firmware. Instead of the ROM 12, an electrically erasable programmable ROM (EEPROM) may be employed. This case can cope with upgrading of the firmware.

A memory controller 13 is formed by, for example, a direct memory access (DMA) controller, and controls reading and writing of data in the RAM 14. The RAM 14 temporarily stores a program to be executed by the CPU 11 and the data required for processing by the CPU 11. The HD 15 stores programs (including not only application programs and an operating program (OS)) installed in the computer 1 and the data required for processing by the CPU 11.

The input unit 16 includes, for example, a keyboard, a mouse, a microphone, and is operated by the user. The input unit 16 supplies the CPU 11 with signals corresponding to user's operations. An output unit 17 includes, for example, a display unit and a speaker, and displays a supplied picture or outputs supplied sound. A communication interface 18 includes, for example, an IEEE (Institute of Electrical and Electronics Engineers) 1394 port, a USB (Universal Serial Bus) port, and a network interface card (NIC) for connecting to a local area network (LAN), and performs communication control in accordance with standards.

A communication controller 19 functions as an interface for exchanging data with the drive 2, for example, in a method such as ATA (AT Attachment).

A data converter 20 is formed by, for example, an MPEG (Moving Picture Experts Group) encoder/decoder. It performs MPEG encoding on AV data supplied from the signal input/output device 4, and outputs, to a bus of the computer 1, an MPEG stream obtained by the MPEG encoding. The data converter 20 performs MPEG decoding on the MPEG stream output to the bus of the computer 1, and outputs, to the bus of the computer 1, AV data obtained by the MPEG decoding, or supplies the AV data to the signal input/output device 4.

Components from the CPU 11 to the data converter 20 are connected to one another by the bus of the computer 1.

In the computer 1 having the above-described configuration, the computer 1 performs the various processes (described later) such that the CPU 11 executes programs installed into the computer 1.

The programs to be executed by the CPU 11 can be recorded beforehand in the HD 15 and ROM 12 used as built-in recording media in the computer 1.

Alternatively, the programs may be temporarily or eternally stored (recorded) on removable recording media such as a flexible disk, a CD-ROM, a magneto-optical (MO) disk, a digital versatile disk (DVD), a magnetic disk, a semiconductor memory. The removable recording media can be provided in the form of so-called "package software".

In addition to installation of the programs from each of the recording media into the computer 1, the programs may be transferred by radio from a download site to the computer 1 through a digital satellite broadcasting satellite or may be transferred by wire to the computer 1 through a LAN or a network such as the Internet. The computer 1 may install the programs into the HD 15 after receiving the programs by the communication interface 18.

In this specification, processing steps constituting each program for causing the computer 1 to perform the various processes are not always performed in a time-series manner in accordance with order shown in the form of a flowchart, and include steps (e.g., steps based on parallel processing or object-based processing) which are executed in parallel or separately.

The program may be executed by one CPU and may be executed by a plurality of CPUs. Also, the program may be transferred and executed in a remote CPU.

Figure 3:
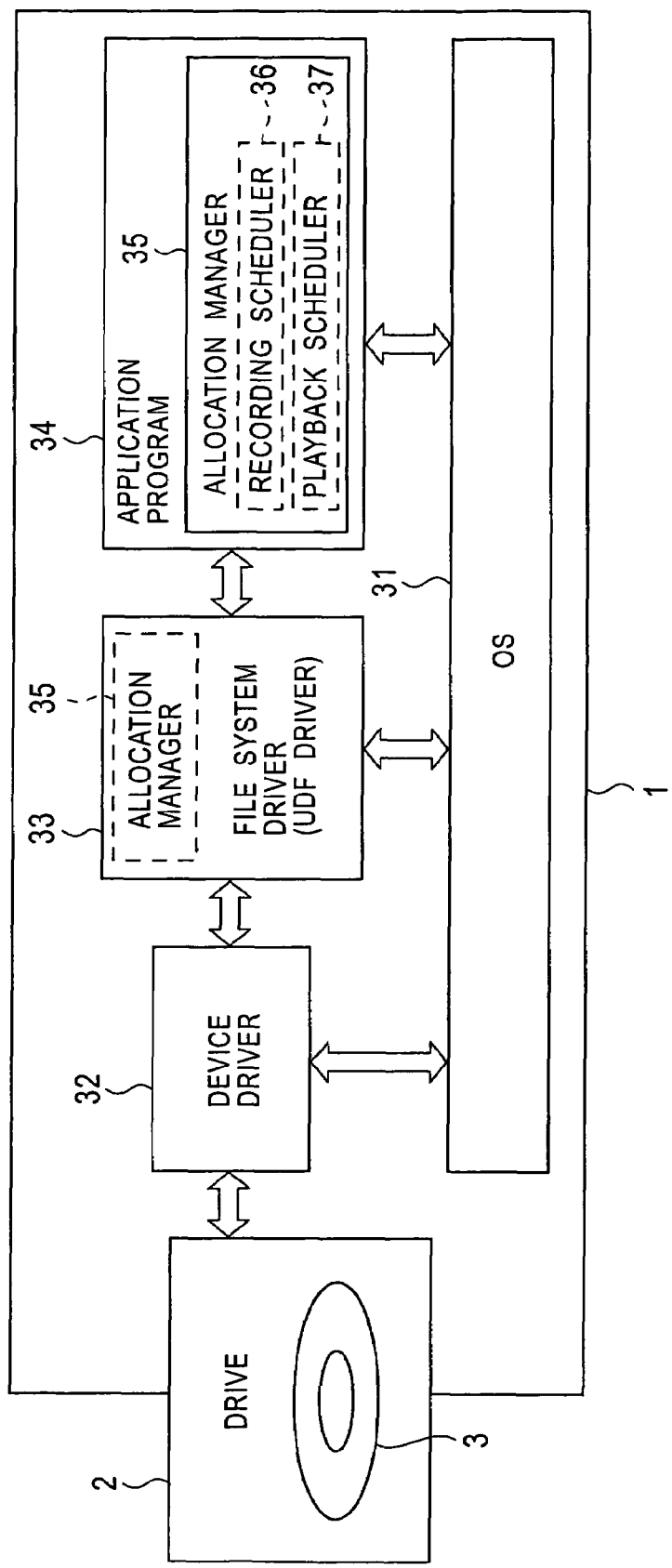
FIG. 3 is a block diagram showing software executed on the computer 1 shown in FIG. 1.

Next, FIG. 3 shows an example of the functional configuration of the computer 1 which is realized such that the CPU 11 in FIG. 2 executes a program.

In the computer 1, under the control of an OS 31, various application programs 34 are executed. Also, under the control of the OS 31, a file system driver 33 and a device driver 32 operate.

In the case of reading/writing data on the optical disk 3 when it is loaded into the drive 2, one application program 34 records data in the file system driver 33, or designates a data-recorded file, and the file system driver 33 designates, for the device driver 32, positional information of the designated file on the optical disk 3. The device driver 32 requests the drive 2 to read/write data in a recording area on the optical disk 3 which is represented by the positional information from the file system driver 33.

In this embodiment, an allocation manager 35 is incorporated into either one of the file system driver 33 and the application program 34, or both of them. The allocation manager 35 controls reading/writing of data on the optical disk 3.

Here, for brevity of description, it is assumed that the allocation manager 35 is incorporated into, for example, the application program 34 between the file system driver 33 and the application program 34. As the application program 34, into which the allocation manager 35 is incorporated, for example, so-called writing software for reading/writing data on the optical disk 3, or the like, may be employed. Also, as the file system driver 33, for example, a universal disk format (UDF) employed in a file system driver for CD-R/RW and DVD, or the like, may be used.

The allocation manager 35 includes a recording scheduler 36 and a playback scheduler 37. When being requested to record data on the optical disk 3 by another application program (not shown) or user's operation of the input unit 16, the recording scheduler 36 schedules the order of recording (writing) data on the optical disk 3, and requests the file system driver 33 to record data on the optical disk 3 in response to the scheduling result. In response to the request from the recording scheduler 36, the file system driver 33 writes the data on the optical disk 3 by using the device driver 32 and the drive 2.

In the drive 2, writing/reading of the data on the optical disk 3 is performed, for example, from the inner circumferential direction to outer circumferential direction of the optical disk 3. In the drive 2, physical blocks each formed by at least one physical sector as a minimum access unit to the optical disk 3 are used as error checking and correction (ECC) units, and reading and writing of data are performed in units of the physical blocks. The physical blocks have assigned physical numbers in ascending order from the inner to outer circumferential direction of the optical disk 3, and logical numbers are assigned to the physical blocks, respectively. Reading and writing of data on the optical disk 3 may be performed from the inner to outer circumferential direction of the optical disk 3. Also, the number of physical sectors constituting each physical block is not particularly limited.

When receiving a request to read/write data from the file system driver 33, the device driver 32 supplies the reading/writing request to the drive 2, with a logical block number (hereinafter referred to also as an "LBN") assigned to a logical block in which the reading/writing is performed. The drive 2 reads/writes data in a physical block of the optical disk 3 which corresponds to a logical block indicated by the logical block number supplied from the device driver 32.

The logical blocks corresponding to the physical blocks have, for example, assigned logical block numbers which are proportional to the physical block numbers of the physical blocks. In this case, when the logical block numbers of the physical blocks are consecutive, the physical block numbers of the physical blocks corresponding to the logical blocks are also consecutive, and also the physical blocks are accordingly consecutive recording areas. In other words, when the logical blocks are consecutive, the physical blocks corresponding to the logical blocks are also consecutive.

As described above, writing or reading of data on the optical disk 3 is performed, for example, from the inner to outer circumferential direction. The physical blocks have assigned ascending physical block numbers from the inner to outer circumferential direction, and logical block numbers proportional to the physical block numbers are assigned to the logical blocks. Therefore, writing or reading of data on the optical disk 3 is performed in ascending order both in the case of the physical block numbers and in the case of the logical block numbers.

When reading of data from the optical disk 3 is requested by another application program (not shown) or user's operation on the input unit 16, the playback scheduler 3 schedules the order of reading the data from the optical disk 3, and requests the file system driver 33 to request the reading of the data from the optical disk 3 in response to the scheduling result. In response to the request from the playback scheduler 3, the file system driver 33 reads the data from the optical disk 3 by using the device driver 32 and the drive 2.

Figure 4:
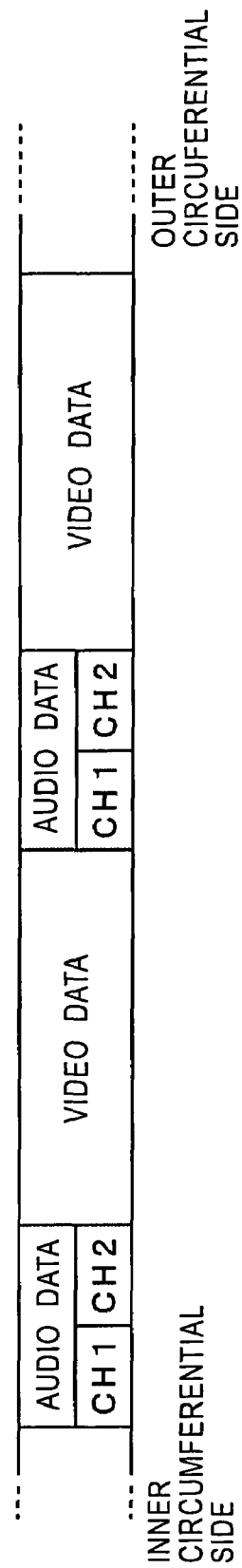
FIG. 4 is an illustration of the logical format of data recorded on the optical disk 3 shown in FIG. 1.

Next, FIG. 4 shows the logical format of video data and audio data associated therewith in a case in which the video data and the audio data are recorded on the optical disk 3 by the recording scheduler 36.

Each of the video data and the audio data is divided into data items in units of predetermined playback duration (e.g., 1.5 to 2 seconds, etc.), and the data items are recorded on the optical disk 3.

In the case shown in FIG. 4, recording of an audio data item in a certain playback duration unit and a subsequent video data item in another (or an equal) playback duration unit is repeatedly performed, that is, the video data and the audio data are alternately recorded. However, the video data and the audio data can be also consecutively recorded in several playback duration units. Also, two audio data items CH1 and CH2 can be recorded as audio data in a certain playback duration unit.

As described above, in this embodiment, when the logical blocks are consecutive, the physical blocks are also consecutive. Thus, the video data items or audio data items in the playback duration units, shown in FIG. 4, are recorded in physically consecutive recording areas on the optical disk 3.

Actually, a defect occurs in the optical disk 3. Regarding assignment of a logical block to a physical block having the defect, the drive 2 performs, for example, slip processing in which the logical block is slipped to a physical block just after the physical block having the defect, and reassignment processing in which the logical block is reassigned to another normal physical block. In the case of performing the slip processing or the reassignment processing, it is not guaranteed that the physical blocks corresponding to the logical blocks having consecutive logical block numbers are consecutive. However, even after the slip processing or the reassignment processing is performed, video data or audio data items in certain playback duration units can be recorded in physically consecutive recording areas of the optical disk 3. In this embodiment, the recording scheduler 36 controls recording, for example, so that the video data or audio data items in certain playback duration units can be recorded in physically consecutive recording areas of the optical disk 3.

Figure 5:
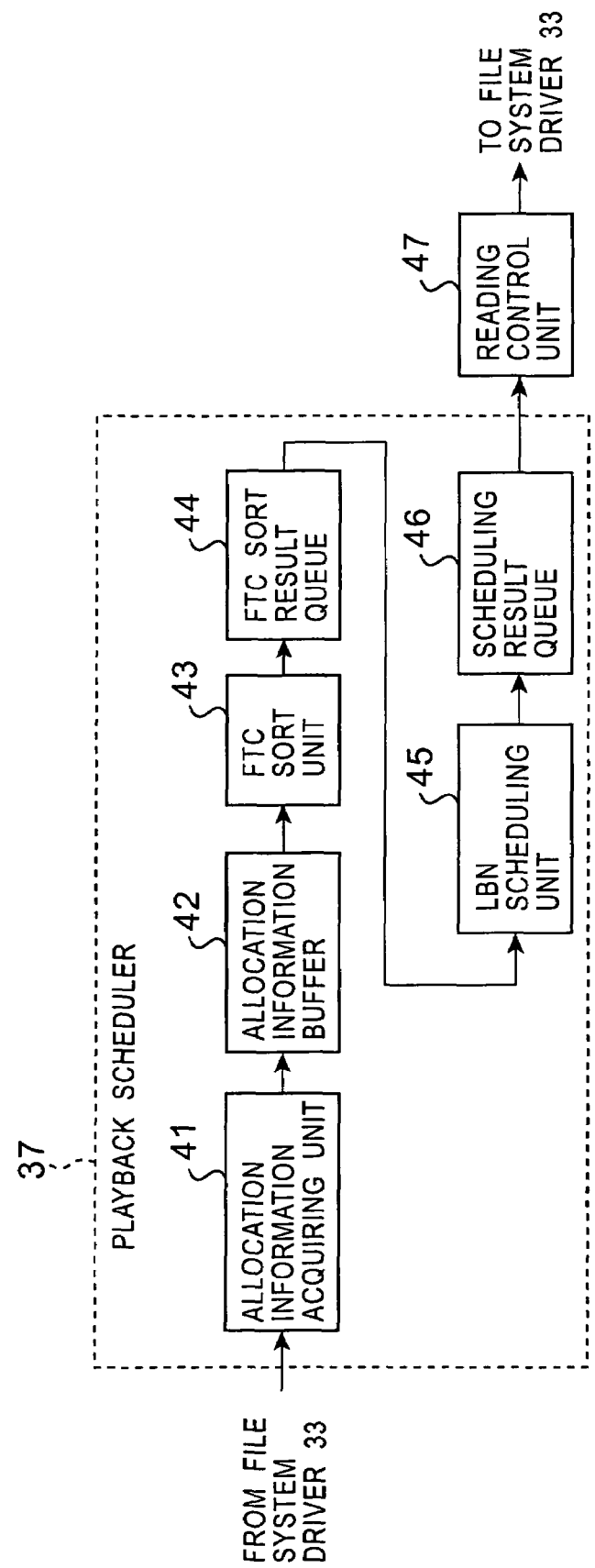
FIG. 5 is a block diagram showing the functional configuration of the playback scheduler 3 shown in FIG. 3.

Next, FIG. 5 is a block diagram of the playback scheduler 3 shown in FIG. 3.

An allocation information acquiring unit 41 requests, from the file system driver 33 (FIG. 3), file information concerning a file storing data recorded on the optical disk 3. From the file information, allocation information (described later) concerning video data and audio data items in certain playback duration units on the optical disk 3 is acquired and output by the allocation information acquiring unit 41. An allocation information buffer 42 sequentially stores pieces of allocation information on extents which are output by the allocation information acquiring unit 41.

A file time code (FTC) sort unit 43 sorts the pieces of allocation information of extents, which are stored in the allocation information buffer 42, based on the playback times of the extents, and supplies the sorting result to an FTC sort result queue 44. The FTC sort result queue 44 temporarily stores the sorting result (of the pieces of allocation information) obtained by the FTC sort unit 43.

A logical block number (LBN) scheduling unit 45 sorts the pieces of allocation information of the extents which are stored in the FTC sort result queue 44, based on recording positions of the extents on the optical disk 3. The LBN scheduling unit 45 supplies a scheduling result queue 46 with the sorting result as the result of reading the extents from the optical disk 3. The scheduling result queue 46 temporarily stores the result of sorting the allocation information of the extents which is obtained by the LBN scheduling unit 45.

In FIG. 5, a reading control unit 47 (not shown in FIG. 3) constitutes the allocation manager 35. In accordance with the allocation information of each extent stored in the scheduling result queue 46, the reading control unit 47 requests the file system driver 33 to read the extent.

Figure 6:
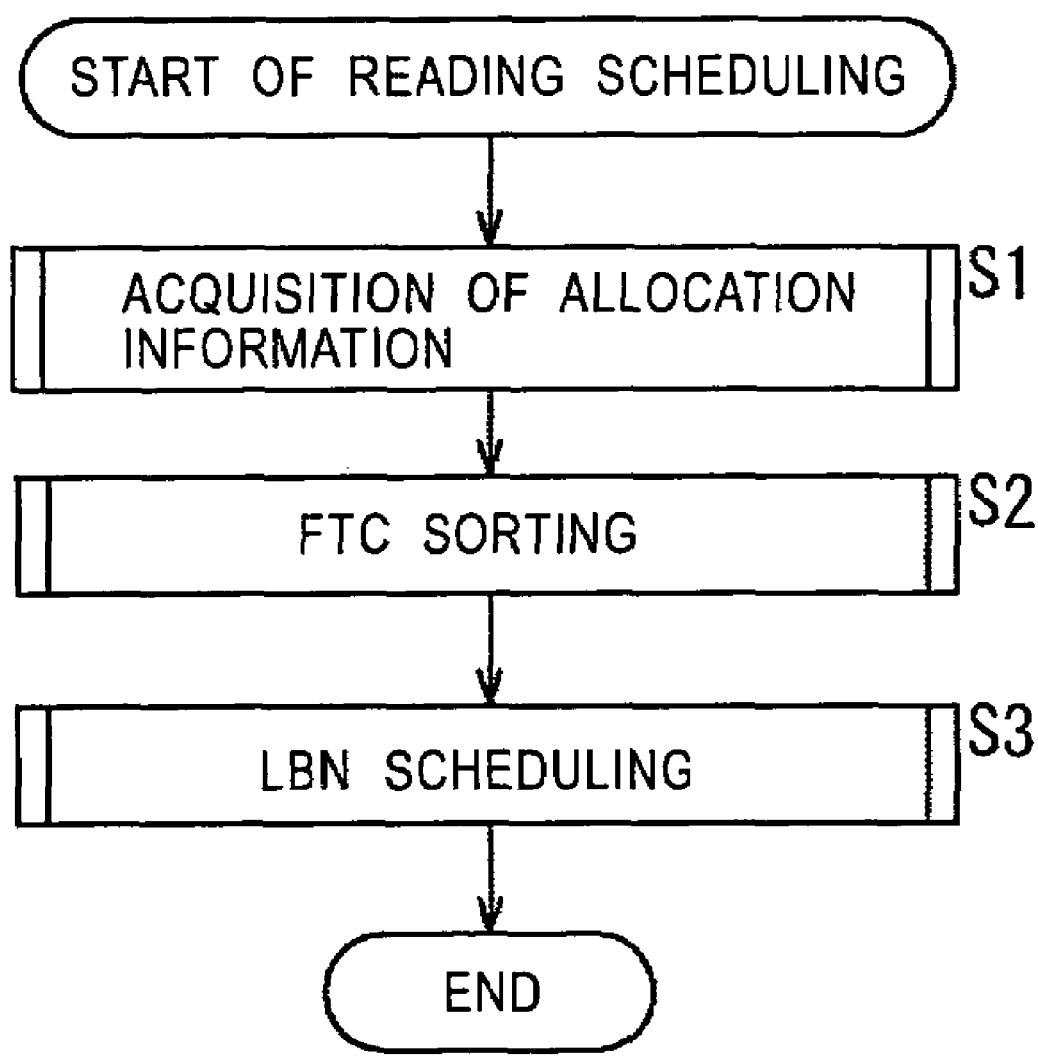
FIG. 6 is a flowchart illustrating a reading scheduling process.

Next, a reading scheduling process in which the playback scheduler 3 in FIG. 5 schedules the order of reading the extents from the optical disk 3 is described below with reference to the flowchart shown in FIG. 6.

In step S1, the allocation information acquiring unit 41 acquires the allocation information of the extents recorded on the optical disk 3, and supplies and stores the acquired allocation information in the allocation information buffer 42. Proceeding to step 2, the FTC sort unit 43 sorts the pieces of allocation information of the extents which are stored in the allocation information buffer 42, based on playback times of the extents. The FTC sort unit supplies and stores the sorting result in the FTC sort result queue 44. The process proceeds to step S3. In step S3, the LBN scheduling unit 45 sorts the pieces of allocation information of the extents which are stored in the FTC sort result queue 44, based on the recording positions of the extents on the optical disk 3. The LBN scheduling unit 45 also supplies and stores, in the scheduling result queue 46, the sorting result as the result of scheduling the order of reading the extents from the optical disk 3, and ends the reading scheduling process.

Next, the allocation information of each extent acquired by the allocation information acquiring unit 41 in FIG. 5 is described below with reference to FIG. 7.

Figure 7:
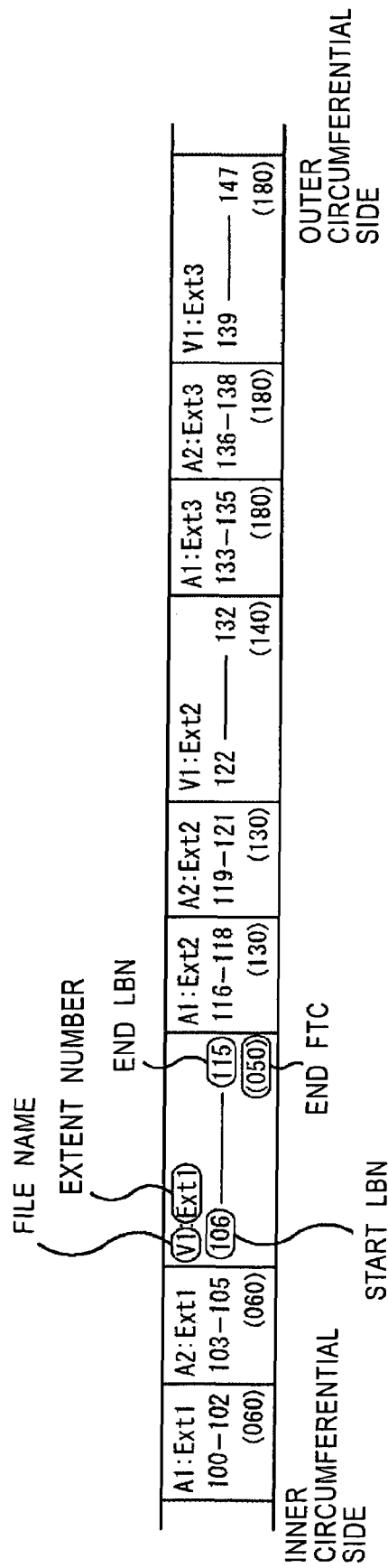
FIG. 7 is an illustration showing the logical recording state of data on the optical disk 3.

FIG. 7 shows a logical recording state of three files consisting of video data file V1, file A1 of audio data of channel CH1, and file A2 of audio data of channel CH2 when the files are recorded on the optical disk 3 by the recording scheduler 36.

One quadrangle in FIG. 7 indicates a video data item or audio data item for certain playback duration, that is, an extent. In FIG. 7, the lateral length of the quadrangle indicating each extent indicates the amount of data of the extent.

In FIG. 7, in the top row of the quadrangle indicating the extent, the file name and extent number of the extent are shown with both separated by a colon (:).

Also, in FIG. 7, in the second row of the quadrangle indicating the extent, the left and right ends of the second row respectively indicate logical block numbers assigned to the start and end of a recording area of the optical disk 3 in which the extent is recorded. The logical block numbers assigned to the start and end logical blocks of the recording area of the optical disk 3 in which the extent is recorded are hereinafter referred to also as the "start logical block number (start LBN)" and the "end logical block number (end LBN)", respectively.

In FIG. 7, in the third row of the quadrangle indicating the extent, the right end of the third row indicates, in a parenthesized form, a file time code (FTC) indicating a playback time at which the last data of the extent must be played back. A playback time may be also regarded as the time outputting to a monitor or the like is performed, and as display timing. For a video data item, the file time code indicates in what frame from the start of playing back the video data item must be played back when the time code of the first frame is 1. For an audio data item, the file time code indicates in what frame from the start of playback a video data item in a frame including the audio data must be played back. A file time code indicating a playback time at which the last data of the extent is hereinafter referred to as an "end file time code (end FTC)", as required.

Accordingly, as is found in FIG. 7, for example, the first (first left) extent in FIG. 7 is the first extent of the audio data of file A1, and is recorded in logical blocks #100 to #102 (logical blocks whose logical block numbers are 100 to 102). Also, the last audio data of the extent must be played back in the 60th frame.

For example, a video data extent may include, not samples up to the last sample of video data in a frame, but samples up to an intermediate sample of the video data in the frame. In this case, the file time code of the frame of the video data in which, for example, samples up to the last sample of the video data in the frame are included in the extent is employed as the end file time code. Specifically, when an extent is formed by video data from the first sample of video data in the $N_1$-th frame to an intermediate sample of video data in the $N_2$-th frame ($N_1 < N_2$), the end file time code of the extent is the $N_2-1$ frame including samples up to the last sample of the video data in the frames. This means that, when the end file time code of an extent is the N-th frame, the extent includes the last sample of video data in the N-th frame but does not include the last sample of video data in the N+1 frame. This applies to an extent of audio data.

The allocation information acquiring unit 41 acquires the file name, extent number, start logical block number, and end logical block number of an extent as described above, as allocation information of the extent.

Figure 8:
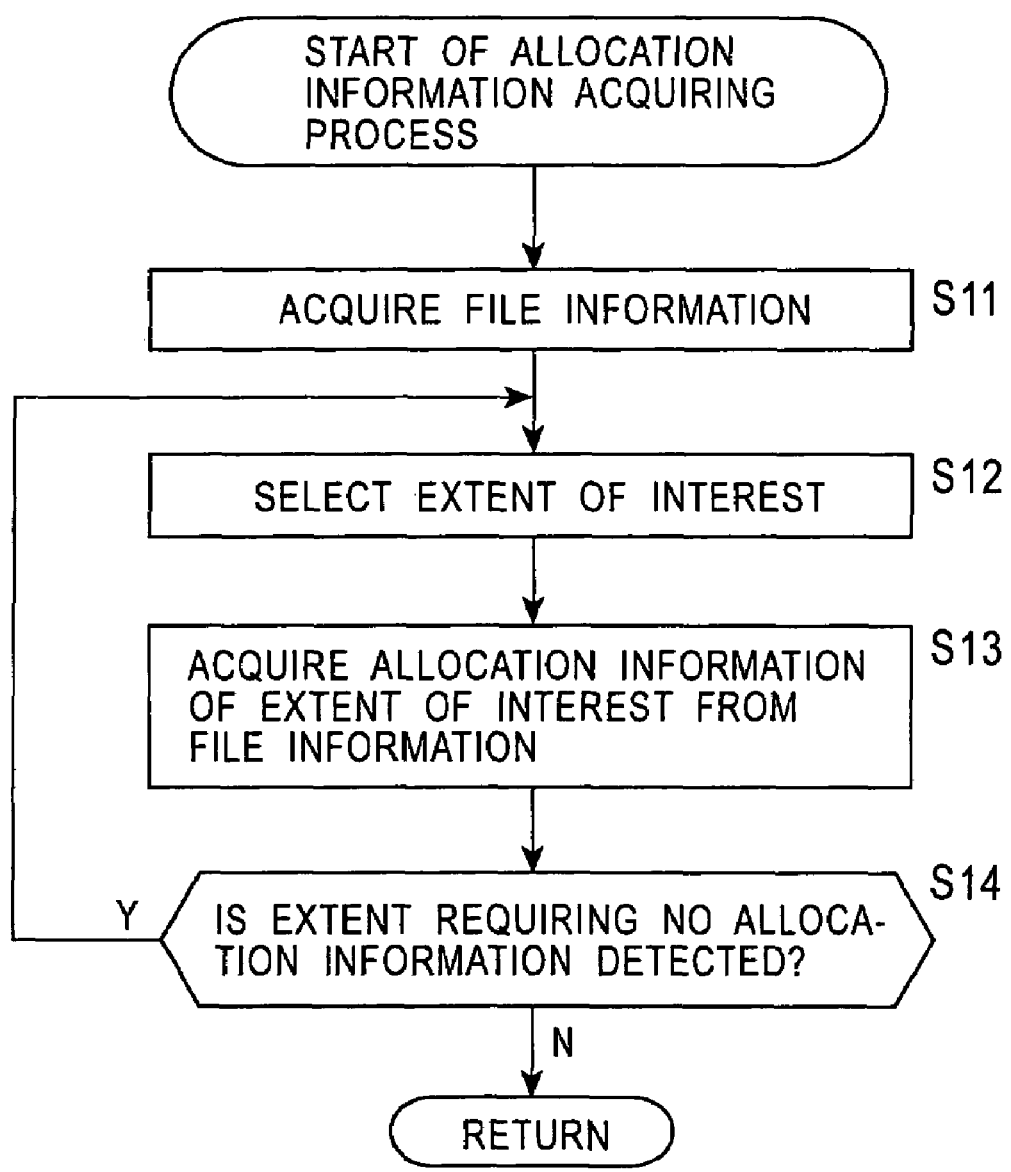
FIG. 8 is a flowchart illustrating an allocation information acquisition process.

The allocation information acquiring process for acquiring allocation information of the extent, performed in step S1 in FIG. 6 by the allocation information acquiring unit 41, is described below with reference to the flowchart shown in FIG. 8.

In step S11, the allocation information acquiring unit 41 requests, from the file system driver 33, file information, which is information concerning files of data recorded on the optical disk 3, and receives and acquires the file information supplied from the file system driver 33 in response to the request.

Proceeding to step S12, the allocation information acquiring unit 41 recognizes the extents recorded on the optical disk 3 by referring to the file information acquired from the file system driver 33, and selects, as an extent of interest, one extent from the recorded extents which has not been selected yet as an extent of interest. The process proceeds to step S13.

In step S13, the allocation information acquiring unit 41 acquires, from the file information obtained in step S11, allocation information of the extent of interest, that is, the file name, extent number, start logical block number, end logical block number, and end file time code of a file constituted by the extent of interest.

In this embodiment, the universal disk format driver employed as the file system driver 33 manages, as file information, for example, the file names of all the files recorded on the optical disk 3, the start logical block numbers of extents constituting the files, and the lengths (data amounts) of the extents. The file system driver 33 provides the file information to the allocation information acquiring unit 41.

Therefore, from the file information, the allocation information acquiring unit 41 can directly obtain the file name and the start logical block number as the allocation information. Also, based on the start logical block number and the length of the extent, which constitute file information, the allocation information acquiring unit 41 can find the end logical block number as allocation information. The allocation information acquiring unit 41 can obtain an extent number by recognizing the order of the extent of interest in a file constituted by the extent of interest.

The allocation information acquiring unit 41 acquires the end file time code, which is the remainder of the allocation information, in the following manner.

In the universal disk format driver employed as the file system driver 33 in this embodiment, when an extent is recorded, a characteristic point information (CPI) table can be created which describes a relationship between the logical block numbers of logical blocks in which the start and end of the extent are recorded in an extent recording mode, and the file time codes of the start and end video data or audio data as the extent. The CPI table can be recorded on the optical disk 3. In this case, the CPI table is included in the file information provided from the file system driver 33 to the allocation information acquiring unit 41, whereby the allocation information acquiring unit 41 can find the end file time code of the extent of interest from its end logical block number by referring to the CPI table.

In the above case of using the CPI table, the end file time code can be found, even if video data or audio data constituting the extent of interest is variable length data in which the amount of data changes in units of frames, or fixed length data in which the amount of data does not change. Also, when the video data or audio data constituting the extent of interest is fixed length data in which the amount of data does not change in units of frames or the like, not only the use of the CPI table, but also the use of the following manner can find the end file time code.

Specifically, when the video data constituting the extent of interest is fixed length data, the amount of data from the start of a file constituted by the extent of interest to the end of the extent of interest is divided by the frame size (the amount of data in one frame), and the resultant quotient is the end file time code of the extent of interest.

The amount of data from the start of the file constituted by the extent of interest to the end of the extent of interest can be provided in a form included in the file information from the universal disk format driver (employed as the file system driver 33 in this embodiment) to the allocation information acquiring unit 41.

However, in a case in which data constituting the extent of interest is audio data, when the end file time code of the extent of interest is found by dividing the amount of data from the start of the file constituted by the extent of interest to the end of the extent of interest by the frame size, the following points must be taken into consideration.

In other words, here, since the frames mean the frames of the video data, a quotient, obtained by dividing the amount of data from the start of the file constituted by the extent to the end of the extent by the amount of video data in one frame (frame size), accurately indicates the end file time code of the extent of interest.

Conversely, regarding an extent of audio data, a quotient, obtained by dividing the amount of data from the start of a file constituted by the extent to the end of the extent by the amount of data in one frame (frame size), does not always indicate the end file time code of the extent of interest.

When video data is based on, for example, the NTSC (National Television System Committee) standard, its frame rate is $30 \times 1000/1001$ (frames/second). Assuming that a sampling rate for audio data is, for example, 48 (kHz), the number of samples of the audio data in one frame is $48 \times 10^3/(30 \times 1000/1001) = 1601.6$, which is not an integer. Assuming that, since the number of samples of the audio data in one frame must be an integer, fractions below decimal point are truncated, and the number of samples of the audio data in one frame is 1601. In this case, the number of samples of the audio data decreases as a whole. When the part "0.6", which is below decimal point of the number of samples of the audio data in one frame, is noted, by increasing 0.6 by five, 3 is obtained and fractions below decimal point are eliminated. This indicates that a frame boundary and a sample boundary of the audio data agree with each other in a five-frame cycle. Accordingly, when the end file time code of an extent of interest is found by dividing the amount of data from the start of a file constituted by an extent of audio data to the end of the extent by the amount (1601–sample data amount) of audio data in one frame, it must be considered that the number of samples of audio data in five frames is 1601 (samples)×5 (frames)+3 (samples).

The frame size of video data or audio data required when the end file time code of an extend is found by using a frame size is recorded as file attribute information in a file entry used as a recording area reserved on the optical disk 3 by the universal disk format driver employed as the file system driver 33. In response to a request from the allocation information acquiring unit 41, the universal disk format driver provides the allocation information acquiring unit 41 with the recorded size in a form included in the file information.

In step S13, after finding allocation information of the extent of interest, the allocation information acquiring unit 41 supplies and stores the allocation information in the allocation information buffer 42. The process proceeds to step S14.

In step S14, the allocation information acquiring unit 41 determines whether or not an extent requiring no allocation information is detected from the extents recorded on the optical disk 3.

In step S14, when determining that the extent requiring no allocation information is detected from the extents recorded on the optical disk 3, the allocation information acquiring unit 41 returns to step S11. The allocation information acquiring unit 41 selects another extent, as an extent of interest, from the extents which have not been selected yet, and repeats similar processing.

In step S14, when determining that the extent requiring no allocation information is not detected from the extents recorded on the optical disk 3, the allocation information acquiring unit 41 ends the allocation information acquiring process and returns.

According to the allocation information acquiring process, as shown in FIG. 7, when the three files, that is, file V1 of video data, file A1 of audio data of channel CH1, and file A2 of audio data of channel CH2 are recorded, as FIG. 9 shows, allocation information of three extents for file V1 of video data, allocation information of three extents for file A1 of audio data, and allocation information of three extents for file A2 of audio data are obtained.

Each extent can be uniquely identified by the file name of a file constituted by the extent and its extent number. Accordingly, the extent is hereinafter indicated by extent fx:Ext#x, where fx represents a file name and Ext#x represents an extent number. In this case, in FIG. 9, for example, the first extent of file V1 of video data is indicated by extent V1:Ext1.

Figure 10:
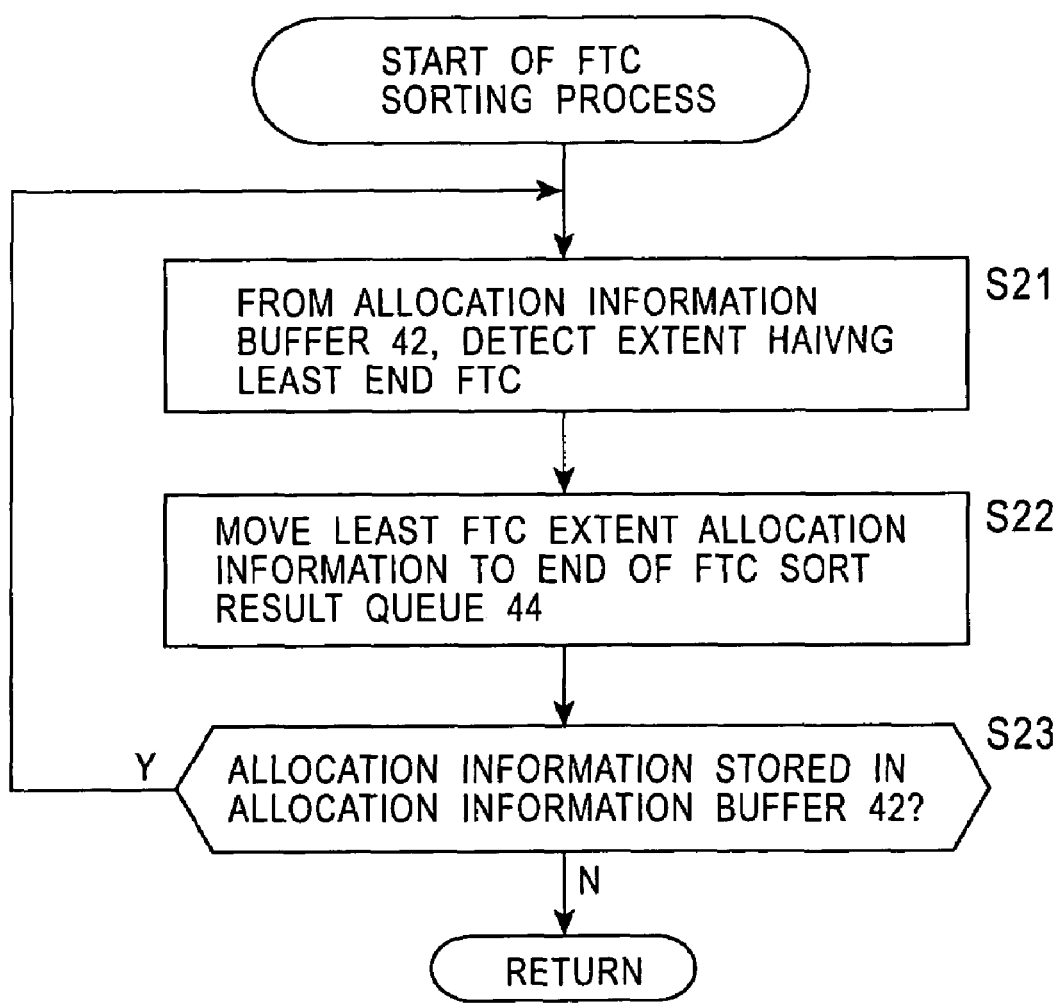
FIG. 10 is a flowchart illustrating an FTC sorting process.

Next, the file-time-code sorting process for sorting the (pieces of allocation information of) extents based on their playback times, performed in step S2 in FIG. 6 by the FTC sort unit 43, is described below with reference to the flowchart shown in FIG. 10.

In step S21, the FTC sort unit 43 detects, from the allocation information of the extents which are stored in the allocation information buffer 42, allocation information (hereinafter referred to as "least-FTC-extent allocation information", if necessary) of an extent having the least end file time code, and proceeds to step S22. In step S22, the FTC sort unit 43 moves the least-FTC-extent allocation information from the allocation information buffer 42 to the end of the FTC sort result queue 44, and proceeds to step S23.

In step S23, the FTC sort unit 43 determines whether or not the allocation information is still stored in the FTC sort unit 43. When determining in step S23 that the allocation information is still in the allocation information buffer 42, the FTC sort unit 43 returns to step S21, and repeats the above processing.

When determining in step S23 that the allocation information is not stored in the allocation information buffer 42, that is, when the allocation information stored in the allocation information buffer 42 has been entirely moved to the FTC sort result queue 44, the FTC sort unit 43 ends the file-time-code sorting process and returns.

Figure 11:
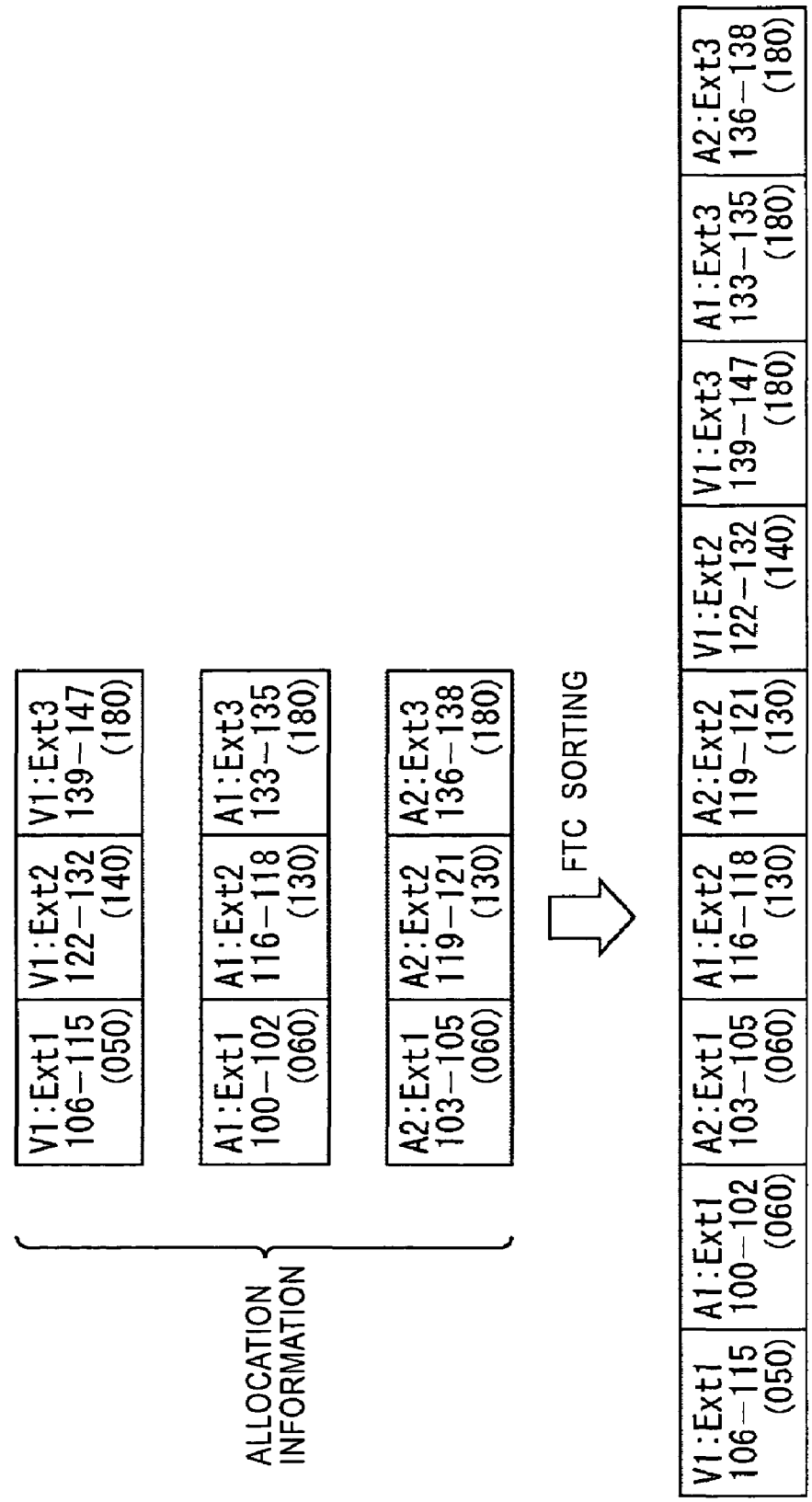
FIG. 11 is an illustration of extents (of allocation information) sorted by the FTC sorting process shown in FIG. 11.

As described above, in the file-time-code sorting process, the allocation information stored in the allocation information buffer 42 is sorted in ascending order of end file time codes, that is, the order of extents having earlier playback times. Therefore, when the allocation information as shown in FIG. 9 is stored in the allocation information buffer 42, as FIG. 11 shows, in the file-time-code sorting process, the allocation information is sorted in ascending order of end file time codes and are stored in the FTC sort result queue 44.

In the file-time-code sorting process, when allocation information of an extent and allocation information of another extent have identical end file time codes, the allocation information of either of the two extents may be firstly moved to the FTC sort result queue 44. In the example shown in FIG. 11, allocation information of extents having identical end file time codes may be moved to the FTC sort result queue 44 in the order of priority of files V1, A1, and A2.

Next, the LBN scheduling process for sorting allocation information of the extents based on the recording positions of the extents, performed in step S3 in FIG. 6 by the LBN scheduling unit 45, is described below with reference to the flowchart shown in FIG. 12.

In the LBN scheduling process, in step S31, the LBN scheduling unit 45 determines whether or not the allocation information is stored in the FTC sort result queue 44. When determining that the allocation information is stored, the LBN scheduling unit 45 proceeds to step S32.

In step S32, for the allocation information of the extents stored in the FTC sort result queue 44, the LBN scheduling unit 45 sets a scheduling window for use in sorting based on the recording positions of the extents on the optical disk 3.

In the FTC sort result queue 44, the pieces of the allocation information of the extents are arranged in the playback times of the extents. Thus, assuming that the duration required to read the extents from the signal input/output device 4 is zero, by reading the extents from the optical disk 3 in the order of the pieces of the allocation information stored in the FTC sort result queue 44, the read extents are arranged in the order of playback.

However, actually, certain duration is required to read the extents from the signal input/output device 4. Accordingly, by reading the extents from the signal input/output device 4 in the order of playing back the extents, a case may occur in which the reading of the extents is late for the playback of the extents.

By way of example, in a case in which one extent Ext1 is played back and another extent Ext2 is played back, when the extent Ext1, which is firstly played back, is recorded on the optical disk 3 after the position of the extent Ext2, which is secondly played back, in the FTC sort result queue 44, pieces of allocation information are stored in the order of the extents Ext1 and Ext2. In this case, by reading the extents Ext1 and Ext2 from the optical disk 3 in the order of the pieces of the allocation information stored in the FTC sort result queue 44, the extents Ext1 and Ext2 are read from the optical disk 3 in the order given.

On the optical disk 3, the extents Ext2 and Ext1 are recorded in the order give. Thus, in the case of reading the extents Ext1 and Ext2 from the optical disk 3 in the order given, after reading the extent Ext1 up to the end thereof, it is required that the start position of the extent Ext2, which is recorded in a position (in which reading/writing is firstly performed in the order of reading/writing data on the optical disk 3) where the extent Ext1 is recorded, be sought before the extent Ext2 is read up to the end thereof. In other words, in this case, after a pickup (not shown) in the drive 2 reads the extent Ext1, seeking occurs which returns to the start position of the extent Ext2, which is recorded before the extent Ext1.

In this case, seeking of the start position of the extent Ext2 from the end of the extent Ext1 requires duration, so that playback of the extent Ext2 may be late for a time at which the extent Ext2 must be played back.

Accordingly, the LBN scheduling unit 45 changes the order of the pieces of the allocation information stored in the FTC sort result queue 44 to the order of the extents recorded on the optical disk 3 so that the extents can be efficiently read from the optical disk 3.

By changing the order of the extents stored in the FTC sort result queue 44 to the order of the extents recorded on the optical disk 3, and reading the extents from the optical disk 3 in the changed order of the pieces of the allocation information, the above occurrence of seeking in which the pickup of the drive 2 returns on the optical disk 3, which is, so-called inefficient, can be prevented.

Also, in this case, playback of one extent may be late for a time at which the extent must be played back.

For example, as described above, in a case in which the extent Ext2, which is secondly played back, is recorded and the extent Ext1, which is firstly played back, is consecutively recorded, when the extent Ext2, which has a recording position before that of the extent Ext1, is read, and the extent Ext1, which is played back before the extent Ext2 is played back, is subsequently played back, playback of the extent Ext1, which is secondly read although it is firstly played back, may be late for a time at which the extent Ext1 must be played back.

Accordingly, the LBN scheduling unit 45 sorts the pieces of the allocation information of the extents stored in the FTC sort result queue 44 so that the extents can be efficiently read from the optical disk 3 while preventing the playback from being interrupted.

Specifically, the LBN scheduling unit 45 does not simultaneously sort all the pieces of the allocation information of the extents stored in the FTC sort result queue 44, but consecutively treats each part of the allocation information, as a processing unit, and performs sorting on the allocation information in the processing unit in the order of the recorded extents.

In step S32, in a predetermined range from the start of the FTC sort result queue 44, the schedule window is set, and the pieces of the allocation information in the schedule window are subject to processing performed by the LBN scheduling unit 45.

Here, the schedule window is set, for example, between the start of the FTC sort result queue 44, and allocation information of an extent whose end file time code is maximum, among extents each having a value equal to or less than a value obtained by adding a window period (representing a predetermined number of frames) to the end file time code of an extent at the start of the FTC sort result queue 44.

Figure 13:
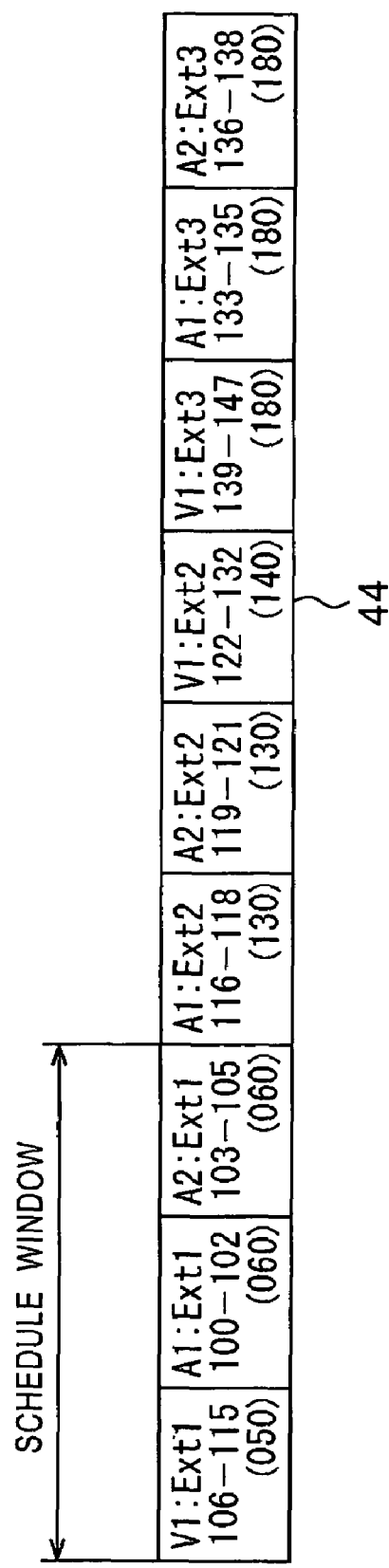
FIG. 13 is an illustration of a schedule window.

Therefore, for example, when the allocation information as shown in FIG. 11 is stored in the FTC sort result queue 44, and the window period is 30 frames, as FIG. 13 shows, the schedule window is set in the pieces of the allocation information from the start extent V1:Ext1 to the third extent A2:Ext2 of the FTC sort result queue 44. In other words, the end file time code of the extent V1:Ext1, in which the piece of the allocation information is stored at the start of the FTC sort result queue 44 (FIG. 13), is 050. Addition of the window period to the end file time code produces 80 (=50 +30) (frames). In FIG. 13, extents whose end file time codes take maximum values of 80 or less are the extents A1:Ext1 and A2:Ext2 whose end file time codes are each 060. Therefore, in the allocation information from the start extent V1:Ext1 to the extent A2:Ext2 of the FTC sort result queue 44, the schedule window is set.

Although setting of a large window period can reduce a possibility that inefficient seeking may occur in which the pickup of the drive 2 returns on the optical disk 3, the buffer capacity required for changing the order of the extents and a delay in playback can be increased. In other words, when there are one extent which is secondly played back although it is firstly read, and another extent which is firstly played back although it is secondly read, in order that the extent which is firstly played back although it is secondly read may be firstly played back and the extent which is secondly played back although it is firstly read may be played back thereafter, the extent which is secondly played back although it is firstly read must be stored in a buffer. Also, since the extent which is firstly played back is read later than the extent which is secondly played back, until the extent which is first played back is read and played back, the extent which is secondly played back cannot be played back, thus producing a delay in playback duration. Setting of a large window period can frequently cause a case in which the extent which is firstly played back is read earlier than the extent which is firstly played back, the buffer capacity required to store the extent which is secondly played back although it is firstly read, and a delay in playback duration may increase.

In addition, setting of a small window period makes it difficult to efficiently prevent the occurrence of inefficient seeking in which the pickup of the drive 2 returns on the optical disk 3.

Therefore, the window period must be determined from the viewpoints of increase in the buffer capacity and delay in playback duration and the frequency of occurrence of inefficient seeking.

Not only the window period is set to a fixed length, but also it can be variable in accordance with some parameters such as the amount of data of the extents and playback duration.

Figure 12:
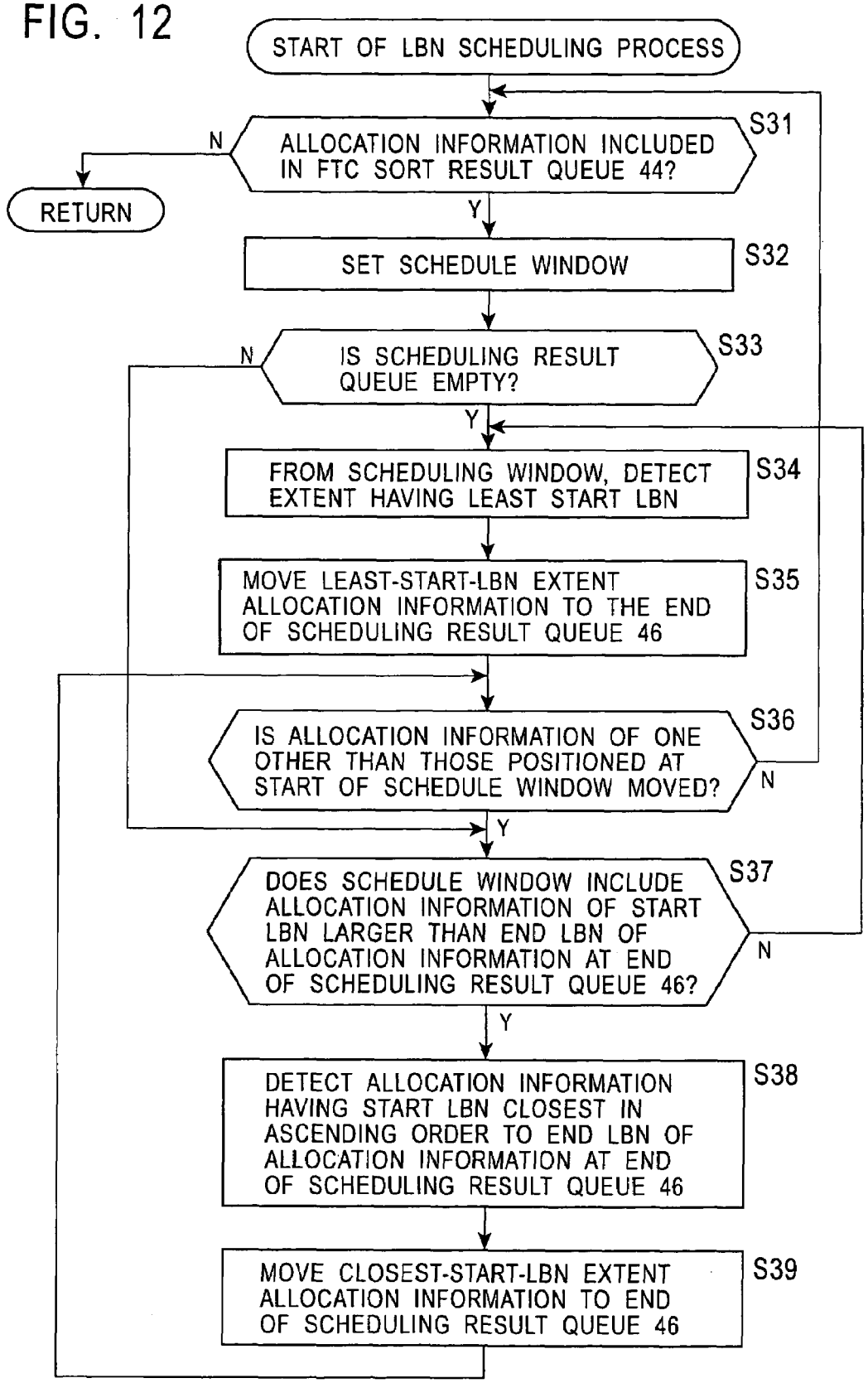
FIG. 12 is a flowchart illustrating an LSB scheduling process.

Referring to FIG. 12, after the schedule window is set in step S32, the process proceeds to step S33, and the LBN scheduling unit 45 determines whether or not the scheduling result queue 46 is empty, by referring to the scheduling result queue 46. When determining in step S33 that the scheduling result queue 46 is empty, that is, when the allocation information of the extents is not stored in the scheduling result queue 46, the LBN scheduling unit 45 proceeds to step S34. From the pieces of the allocation information in the schedule window, the LBN scheduling unit 45 detects allocation information (hereinafter referred to as "least-start-LBN extent-allocation information", if necessary) of an extent having the least start logical block number, that is, an extent (extent which is read/written earliest in the order of reading/writing data on the optical disk 3) which has the earliest recording position on the optical disk 3, and proceeds to step S35.

In step S35, the LBN scheduling unit 45 moves the least-start-LBN extent-allocation information detected in step S34 from the FTC sort result queue 44 to the end of the scheduling result queue 46, and proceeds to step S36.

Therefore, when the scheduling result queue 46 is empty, the least-start-LBN extent-allocation information is detected from the FTC sort result queue 44, that is, among the pieces of the allocation information in the schedule window, a pieces of the allocation information which has the earliest playback time is moved to the start of the scheduling result queue 46.

In step S36, the LBN scheduling unit 45 determines whether or not the latest allocation information of the extent moved from the FTC sort result queue 44 to the scheduling result queue 46 is other than an extent positioned at the start of the schedule window. When determining in step S36 that the latest allocation information of the extent moved from the FTC sort result queue 44 to the scheduling result queue 46 is other than an extent positioned at the start of the schedule window, that is, when the latest allocation information of the extent moved from the FTC sort result queue 44 to the scheduling result queue 46 is at the start of the schedule window, the process returns to step S31.

As described above, in step S31, it is determined whether or not the allocation information is stored in the FTC sort result queue 44. When the allocation information is stored, the process proceeds to step S32. As described above, the schedule window is set for the pieces of the allocation information stored in the FTC sort result queue 44, and similar processing is repeated.

In other words, when the allocation information of the extent at the start of the schedule window has been moved from the FTC sort result queue 44 to the scheduling result queue 46, the schedule window is set again (reset).

Also, in step S33, when it is determined that the scheduling result queue 46 is not empty, that is, when the scheduling result queue 46 stores the allocation information of the extents, the process skips over steps S34 to S36 and proceeds to step S37.

Here, in step S36, also when it is determined that the latest allocation information of the extent moved from the 44 to the scheduling result queue 46 is not positioned at the start of the schedule window, the process proceeds to step S37. Step S37 is performed, not only in the case of determining in step S33 that the scheduling result queue 46 is not empty, but also in the case in the above step S35 or step S39 (described later) in which the allocation information of the extent is moved from the FTC sort result queue 44 to the scheduling result queue 46, and step S37 is performed after step S36. When step S36 is used to perform step S37 after step S35 or S39, the scheduling result queue 46 stores the allocation information of the extent moved in adjacent step S35 or S39. Thus, in any case, step S37 is performed when the scheduling result queue 46 stores the allocation information of the extent.

In step S37, the LBN scheduling unit 45 determines whether or not the schedule window includes allocation information of an extent having a start logical block number larger than the end logical block number of the allocation information of the extent at the end of the scheduling result queue 46. In step S37, when it is determined that the schedule window does not include allocation information of an extent having a start logical block number larger than the end logical block number of the allocation information of the extent at the end of the scheduling result queue 46, that is, when the schedule window does not include the allocation information of the extent which is recorded in a position on the optical disk 3 after the extent whose allocation information is stored at the end of the scheduling result queue 46, the process returns to step S34, and the LBN scheduling unit 45 detects the least-start-LBN extent-allocation information from the allocation information of the extents in the schedule window, as described above. The process proceeds to step S35. In step S35, the LBN scheduling unit 45 moves the least-start-LBN extent-allocation information detected in step S34 from the FTC sort result queue 44 to the end of the scheduling result queue 46, and proceeds to step S36. Subsequently, similar processing is repeatedly performed.

Accordingly, when the scheduling result queue 46 is not empty, and the schedule window does not include the allocation information of the extent which is recorded in a position on the optical disk 3 after the extent whose allocation information is stored at the end of the scheduling result queue 46, the least-start-LBN extent-allocation information is detected from the FTC sort result queue 44, and is moved to the end of the scheduling result queue 46. Specifically, when the schedule window does not include the allocation information of the extent which is recorded in a position on the optical disk 3 after the extent whose allocation information is stored at the end of the scheduling result queue 46, among the pieces of the allocation information in the schedule window, allocation information of an extent having the earliest playback time is moved to the end of the scheduling result queue 46.

Also, in step S37, when it is determined that the schedule window does not include the allocation information of the extent having the start logical block number larger than the end logical block number of the allocation information of the extent at the end of the scheduling result queue 46, that is, when the schedule window includes the allocation information of the extent which is recorded in a position on the optical disk 3 after the extent whose allocation information is stored at the end of the scheduling result queue 46, the process proceeds to step S38. In step S38, the LBN scheduling unit 45 detects, from the allocation information of the extents in the schedule window, allocation information (hereinafter referred to as "latest start-LBN extent-allocation information", if necessary) of an extent having a start logical block number which is closet in ascending direction to the end logical block number of an extent (hereinafter referred to as an "end extent") whose allocation information is stored at the end of the scheduling result queue 46, that is, allocation information of an extent which is recorded in a position on the optical disk 3 after the extent (end extent) whose allocation information is stored at the end of the scheduling result queue 46, and which is closet to the recording position of the end extent. The LBN scheduling unit 45 proceeds to step S39.

In step S39, the LBN scheduling unit 45 moves the latest start-LBN extent-allocation information detected in step S38 from the FTC sort result queue 44 to the end of the scheduling result queue 46, and proceeds to step S36. Subsequently, similar processing is repeatedly performed.

Therefore, when the scheduling result queue 46 is not empty, and the schedule window includes the allocation information of the extent which is recorded in a position on the optical disk 3 after the extent whose allocation information is stored at the end of the scheduling result queue 46, which is not empty, the latest start-LBN extent-allocation information is detected from the FTC sort result queue 44 and is moved to the end of the scheduling result queue 46. In other words, when the schedule window includes the allocation information of the extent which is recorded in a position on the optical disk 3 after the extent (end extent) whose allocation information is stored at the end of the scheduling result queue 46, among the pieces of the allocation information in the schedule window, allocation information (latest start-LBN extent-allocation information) of the extent which is recorded in a position which is after the end extent, and which is closest to the recording position of the end extent is moved to the end of the scheduling result queue 46.

According to steps S37 to S39, even if the schedule window includes the allocation information of an extent which is played back before playing back the extent (end extent) whose allocation information is stored at the end of the scheduling result queue 46, scheduling may be performed so as to read an extent recorded in a position which is after the end extent and which is closest to the recording position of the end extent.

For example, playback times are represented by t1, t2, and t3(t1<t2<t3), respectively, logical block numbers of logical blocks in which extents are recorded are represented by LBN#1, LBN#2, LBN#3, respectively, and an extent which is played back at a certain playback time tx and which is recorded in LBN#x of the optical disk 3 is represented by Ext(tx,LBN#x).

In addition, for example, when three extents Ext(t1, LBN#1), Ext(t2,LBN#2), and Ext(t3,LBN#3) are recorded in consecutive recording areas, (allocation information of) extent Ext(t2,LBN#2) is stored at the end of the scheduling result queue 46, and (allocation information of) extents Ext(t1,LBN#1) and Ext(t3,LBN#3) are included in the schedule window, from the viewpoint of preventing interruption of playback, between the extents Ext(t1,LBN#1) and Ext(t3,LBN#3) included in the schedule window, scheduling must be performed so that the extent Ext(t1,LBN#1), which is firstly played back, is firstly read, and the Ext(t3,LBN#3), which is secondly played back, is secondly read.

However, in step S39, between the extents Ext(t1,LBN#1) and Ext(t3,LBN#3) included in the schedule window, not the extent Ext(t1,LBN#1), which has an earlier playback time, but the extent Ext(t3,LBN#3), which has a later playback time, is moved to a position just after the extent Ext(t2, LBN#2) in the scheduling result queue 46, whereby scheduling is performed so that the extent Ext(t2,LBN#2), which is secondly played back, is read from the optical disk 3 earlier than the extent Ext(t1,LBN#1), which is firstly played back. This is caused by the following reason.

In the above case, the extent Ext(t2,LBN#2) is stored at the end of the scheduling result queue 46, and among the three extents Ext(t1,LBN#1), Ext(t2,LBN#2), and Ext(t3, LBN#3), the extent Ext(t2,LBN#2) at the end of the scheduling result queue 46 is firstly read from the optical disk 3.

Therefore, after that, when the extent Ext(t1,LBN#1), which is firstly played back, is firstly read, and the extent Ext(t3,LBN#3), which is secondly played back, is secondly read, the pickup of the drive 2 must perform reading the extent Ext(t2,LBN#2), reading the extent Ext(t1,LBN#1) after returning to the start position of the extent Ext(t1, LBN#1), which is recorded in a position before the extent Ext(t2,LBN#2), and reading the extent Ext(t3,LBN#3) after proceeding to the start position of the extent Ext(t3,LBN#3), which is recorded in a position after the extent Ext(t2, LBN#2). As a result, the number of times seeking is performed is two. Specifically, seeking is performed when changing the reading of the extent Ext(t2,LBN#2) to the reading of the extent Ext(t1,LBN#1), and when changing the reading of the extent Ext(t1,LBN#1) to the reading of the extent Ext(t3,LBN#3).

Conversely, when the extent Ext(t3,LBN#3), which is secondly played back, is firstly read, and the extent Ext(t1, LBN#1), which is firstly played back, is secondly read, after the pickup of the drive 2 reads the extent Ext(t2,LBN#2), it reads the extent Ext(t3,LBN#3), which is consecutively recorded just after the extent Ext(t2,LBN#2), and reads the extent Ext(t1,LBN#1), which is recorded just before the extent Ext(t2,LBN#2). Thus, the number of times seeking is performed is one. Seeking is performed when changing the reading of the extent Ext(t3,LBN#3) to the reading of the extent Ext(t1,LBN#1).

Since the number of times seeking is performed decreases as described above, the duration required to read the extents from the optical disk 3 is reduced as a whole. As a result, this enables efficient reading from the optical disk 3.

In step S31, when all the pieces of the allocation information of the extents stored in the FTC sort result queue 44 are moved to the scheduling result queue 46, that, is, when, in step S35 or S39, the allocation information of each extent stored in the FTC sort result queue 44 is moved to the scheduling result queue 46, the LBN scheduling process ends and the process returns.

As described above, the reading control unit 47 sequentially reads (and deletes) the allocation information stored in the scheduling result queue 46 from the start of the allocation information, and controls the file system driver 33 so that an extent identified by the read allocation information is read from the optical disk 3.

Next, the LBN scheduling process of the LBN scheduling unit 45 is described below with reference to FIGS. 14 to 18. In the following description, it is assumed that the window period of the schedule window is, for example, 30 frames, as described above.

Assuming that, as shown in FIG. 11, the pieces of the allocation information of the extents are stored in the FTC sort result queue 44, as FIG. 13 shows, the schedule window is set (step S32) in the range of three extents V1:Ext1, A1:Ext1, and A2:Ext1 from the extent V1:Ext1 at the start of the FTC sort result queue 44 to the extent A2:Ext1, in which the end file time code is 060 which is a maximum value equal to or less than a value (080) obtained by adding 30 frames as the window period to the end file time code (050) of the start extent V1:Ext1 in the FTC sort result queue 44.

Figure 14:
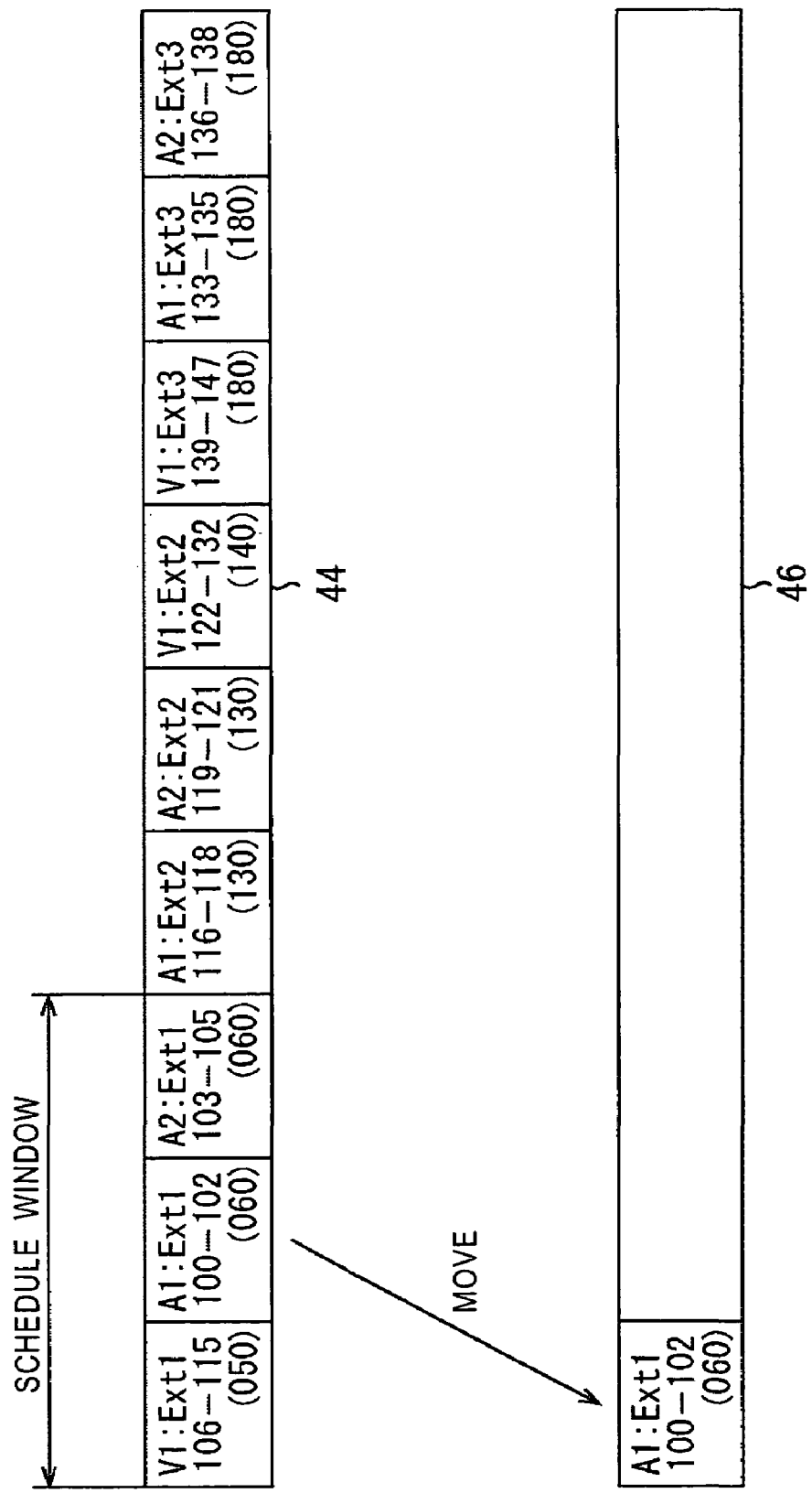
FIG. 14 is an illustration of a state in which an extent is moved from the FTC sort result queue 44 (shown in FIG. 13) to a scheduling result queue 46.

Since, in this case, no allocation information is stored in the scheduling result queue 46, among the three extents V1:Ext1, A1:Ext1, and A2:Ext1 in the schedule window, the extent A1:Ext1, which has the least logical block number of 100, is detected (steps S33 and S34), and as FIG. 14 shows, the detected extent is moved from the FTC sort result queue 44 to the scheduling result queue 46 (step S35). The extent A1:Ext1 is moved from the FTC sort result queue 44 to the scheduling result queue 46, whereby, as FIG. 15 shows, two extents V1:Ext1 and A2:Ext1 are included in the schedule window.

As described above, the extent A1:Ext1 is moved from the FTC sort result queue 44 to the scheduling result queue 46, whereby the scheduling result queue 46 is not empty. Also, the start logical block numbers of the two extents V1:Ext1 and A2:Ext1 in the schedule window are 106 and 103, respectively, and each logical block number is larger than 102 as the end logical block number of the extent A1:Ext1 stored at the end of the scheduling result queue 46.

Figure 15:
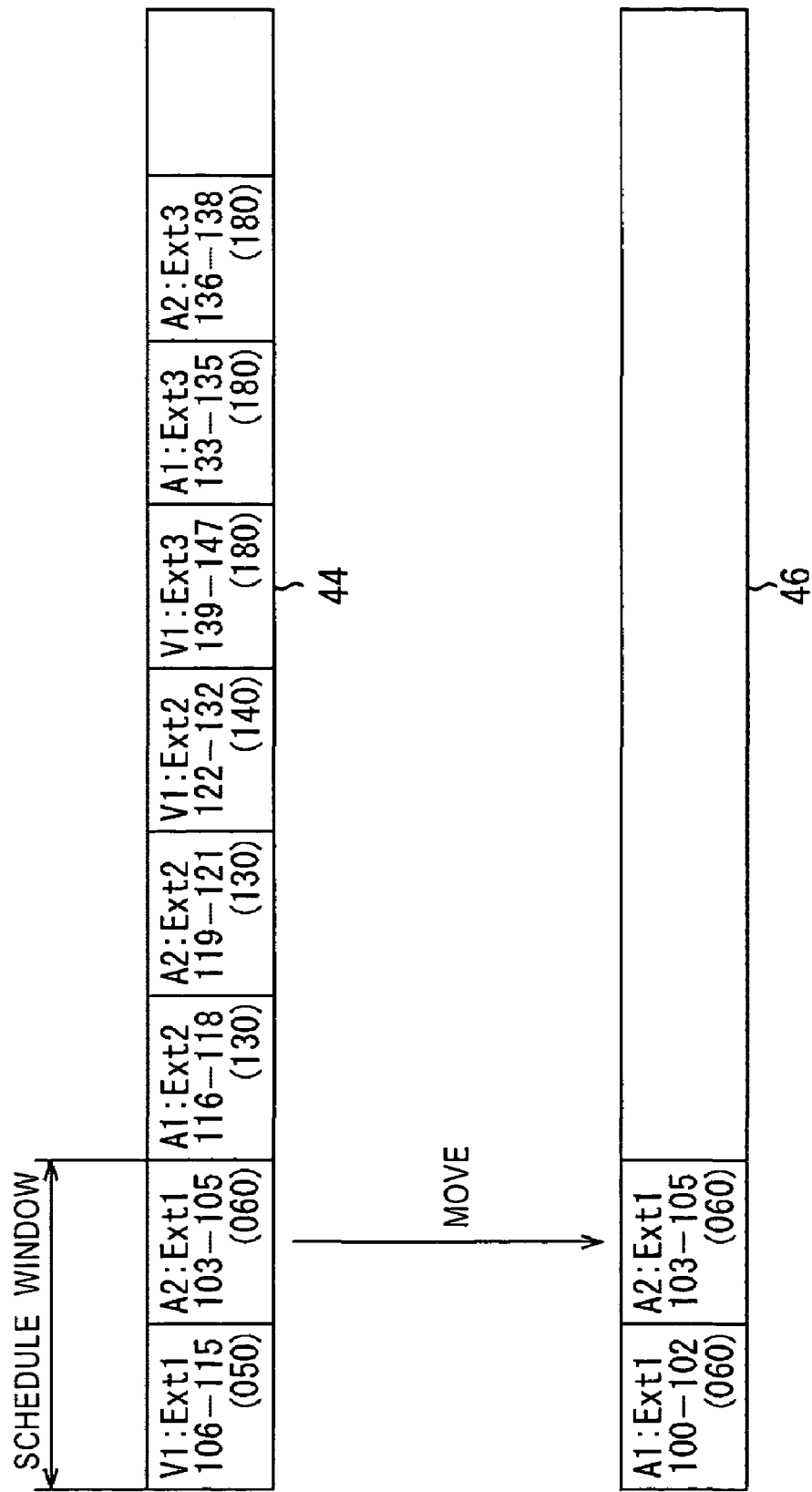
FIG. 15 is an illustration of a state in which an extent is moved from the FTC sort result queue 44 to the scheduling result queue 46.

Therefore, between the extents V1:Ext1 and A2:Ext1 in the schedule window, the extent A2:Ext1, whose start logical block number is 103 being closest in ascending direction to 102 as the end logical block number of the extent A1:Ext1 stored at the end of the scheduling result queue 46, is detected (steps S33, S37, and S38), and is moved from the FTC sort result queue 44 to the scheduling result queue 46, as shown in FIG. 15 (step S39).

Figure 16:
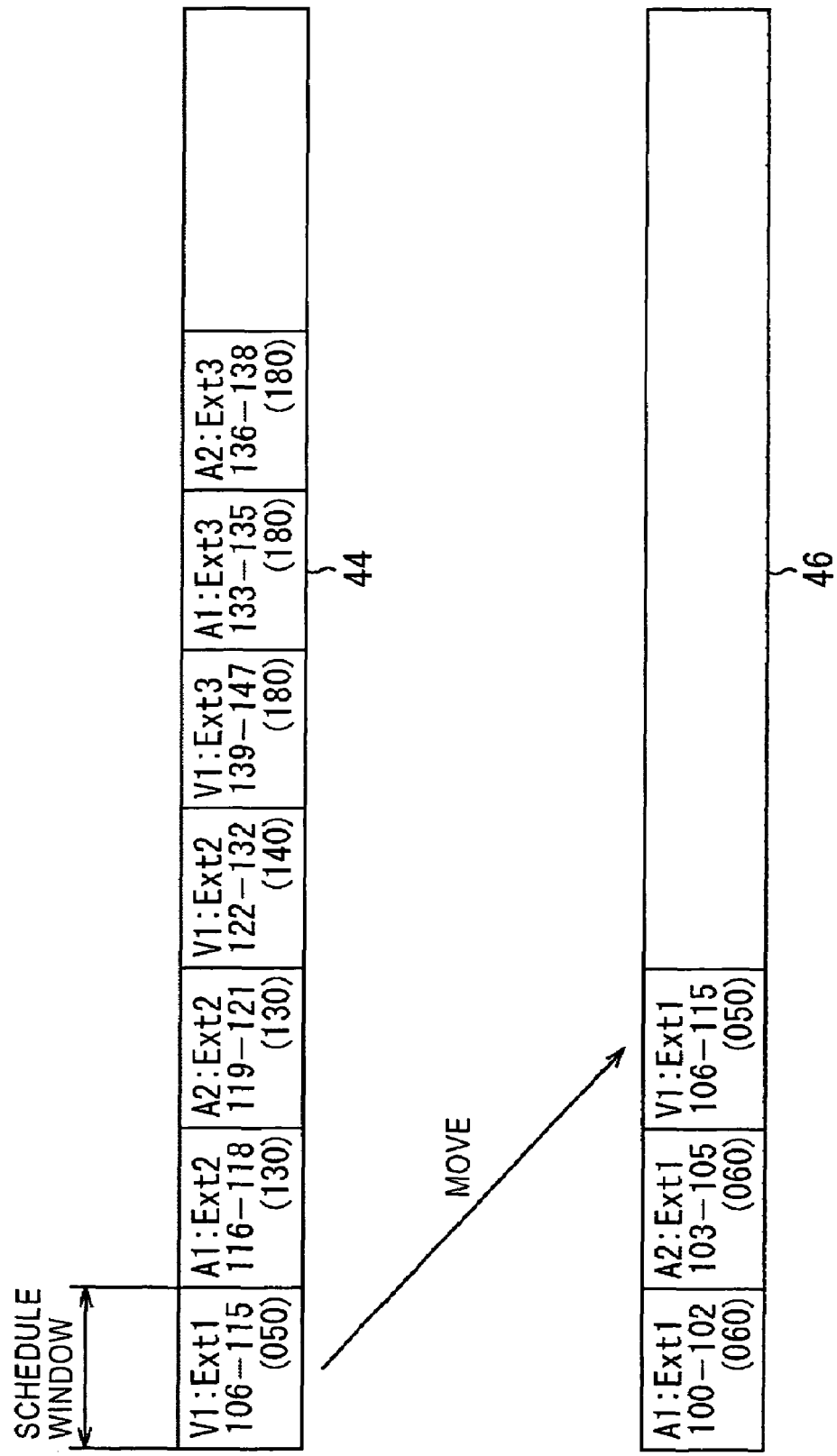
FIG. 16 is an illustration of a state in which an extent is moved from the FTC sort result queue 44 to the scheduling result queue 46.

The extent A2:Ext1 is moved from the FTC sort result queue 44 to the scheduling result queue 46, whereby the schedule window includes only one extent V1:Ext1, as shown in FIG. 16.

In addition, as described above, the scheduling result queue 46 is not empty, and the scheduling result queue 46 includes, at its end, the extent A2:Ext1, whose end logical block number is 105. The start logical block number of one extent V1:Ext1 in the schedule window is 106, as described above, and is greater than 105 as the end logical block number of the extent A2:Ext1 stored at the end of the scheduling result queue 46.

Accordingly, the extent V1:Ext1 in the schedule window is detected as an extent whose start logical block number is 106 being closest in ascending direction to 105 as the end logical block number of the extent A2:Ext1 stored at the end of the scheduling result queue 46 (steps S37 and S38), and is moved from the FTC sort result queue 44 to the scheduling result queue 46, as shown in FIG. 16 (step S39).

In the above case, the extent V1:Ext1, moved from the FTC sort result queue 44 to the scheduling result queue 46, has been at the start of the schedule window (step S36), and the FTC sort result queue 44 still stores (the allocation information of) the extents A1:Ext2, A2:Ext2, V1:Ext2, V1:Ext3, A1:Ext3, and A2:Ext3. Thus, the schedule window is reset (step S32).

In the above case, the FTC sort result queue 44 stores, at its start, the extent A1:Ext2 whose end file time code is 130. Thus, as FIG. 17 shows, the schedule window is reset in the range of three extents A1:Ext2, A2:Ext2, and V1:Ext2 from the extent A1:Ext2 at the start of the FTC sort result queue 44 to the extent V1:Ext2, whose end file time code is 140 which is a maximum value equal to or less than a value (160) obtained by adding 30 frames as the window period to the end file time code (130) of the extent A1:Ext2 at the start of the FTC sort result queue 44 (step S32).

In the above case, as described above, the scheduling result queue 46 is not empty, and the scheduling result queue 46 includes, at its end, the extent V1:Ext1 whose end logical block number is 115. The start logical block numbers of three extents A1:Ext2, A2:Ext2, and V1:Ext2 are 116, 119, and 122, respectively, and each start logical block number is greater than 115 which is the end logical block number of the extent V1:Ext1 stored at the end of the scheduling result queue 46.

Figure 17:
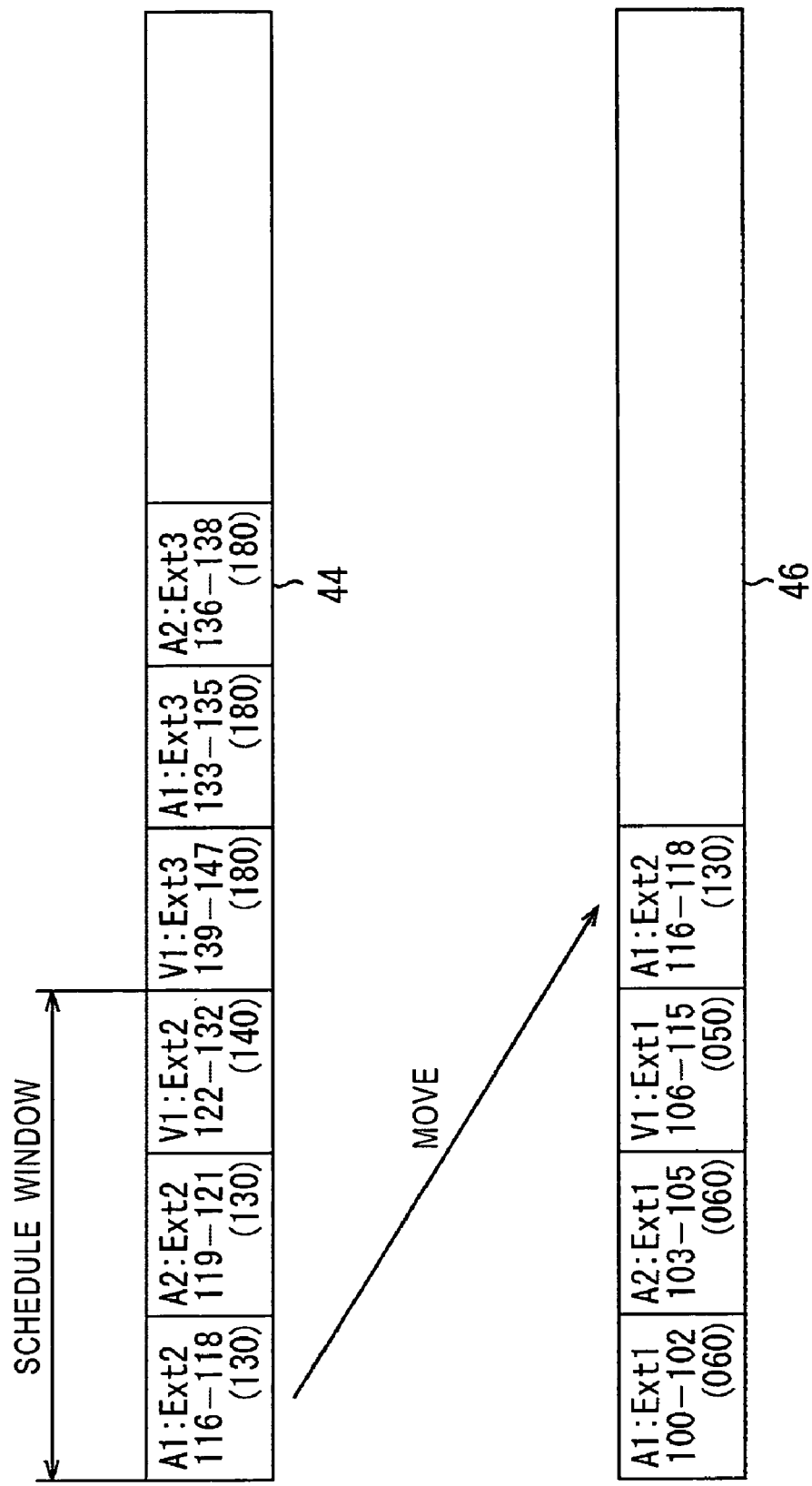
FIG. 17 is an illustration of a state in which an extent is moved from the FTC sort result queue 44 to the scheduling result queue 46.

Accordingly, among the tree extents A1:Ext1, A2:Ext1, and V1:Ext1, the extent A1:Ext2, whose start logical block number is 116 being closest in ascending direction to 115 as the end logical block number of the extent V1:Ext1 stored at the end of the scheduling result queue 46, is detected (steps S37 and S38), and is moved from the FTC sort result queue 44 to the scheduling result queue 46, as shown in FIG. 17 (step S39).

In the above case, the extent A1:Ext2, moved from the FTC sort result queue 44 to the scheduling result queue 46, has been at the start of the schedule window (step S36), and the FTC sort result queue 44 still stores the extents (allocation information of) A2:Ext2, V1:Ext2, V1:Ext3, A1:Ext3, and A2:Ext3. Thus, the schedule window is reset (step S32).

Subsequently, in a similar manner, (allocation information of) the extents are moved from the FTC sort result queue 44 to the scheduling result queue 46, and a scheduling result as shown in FIG. 18 is finally obtained. The scheduling result in FIG. 18 has the order of reading the extents A1:Ext1, A2:Ext1, V1:Ext1, A1:Ext2, A2:Ext2, V1:Ext2, A1:Ext3, A2:Ext3, and V1:Ext3.

As described above, by sorting the extents recorded on the optical disk 3 based on the playback times of the extents, sorting the sorted extents based on the recording positions of the extents on the optical disk 3, and using the sorting result as the result of scheduling the order of reading the extents from the optical disk 3, the extents can be efficiently read from the optical disk 3 while preventing the playback of the extents from being interrupted.

In the above case, the schedule window is reset when the start extent in the schedule window is moved from the FTC sort result queue 44 to the scheduling result queue 46. However, the schedule window can be reset whenever each extent is moved from the FTC sort result queue 44 to the scheduling result queue 46, or when all the extents in an once set schedule window are moved from the FTC sort result queue 44 to the scheduling result queue 46.

Although, in the above case, the pieces of the allocation information of extents are sorted based on end file time codes of the extents in the FTC sort unit 43, the FTC sort unit 43 also uses, a start file time code, a file time code representing a playback time at which the first data of each extent must be played back, and may sort the pieces of the allocation information of the extents based on, for example, the start file time codes of the extents.

In this case, in the allocation information acquiring unit 41, the start file time code is found instead of an end file time code, as a type of allocation information of the extents. For example, when the start file time codes of the nine extents V1:Ext1, V1:Ext2, V1:Ext3, A1:Ext1, A1:Ext2, A1:Ext3, A2:Ext1, A2:Ext2, and A2:Ext3 are 010, 060, 140, 010, 050, 130, 010, 050, 130, respectively, the pieces of the allocation information of the extents are sorted based on the start file time codes of the extents by the FTC sort unit 43, whereby, for example, as FIG. 19 shows, the pieces of the allocation information are sorted in the order of the extents V1:Ext1, A1:Ext1, A2:Ext1, A1:Ext2, A2:Ext2, V1:Ext2, A1:Ext3, A2:Ext3, and V1:Ext3 in the FTC sort result queue 44.

Figure 19:
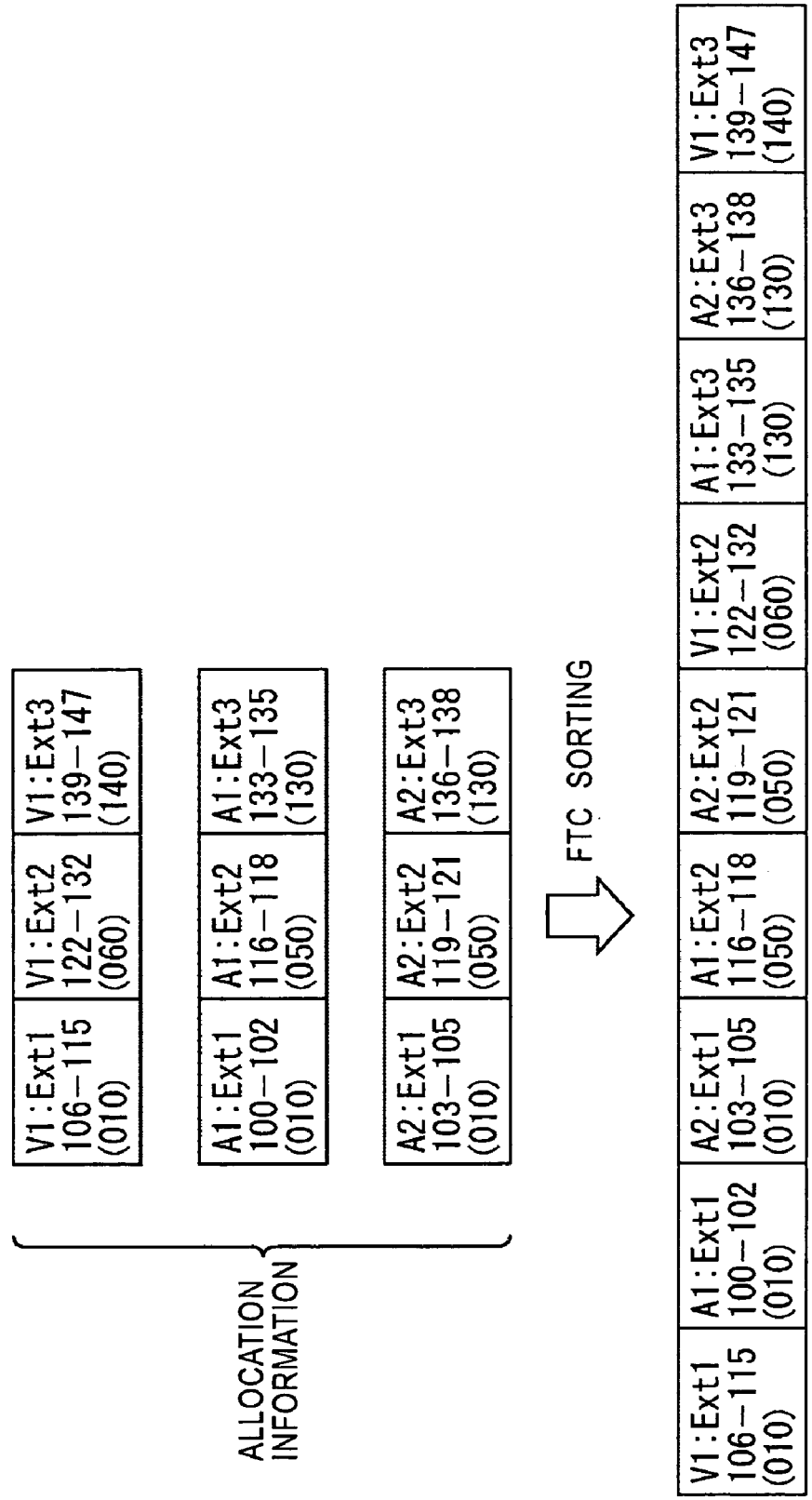
FIG. 19 is an illustration of extents (of allocation information) sorted based on a start FTC by the FTC sorting process shown in FIG. 10.

Similarly to the case of FIG. 7, in FIG. 19, the first row of each quadrangle indicating allocation information of each extent indicates the file name of the extent and an extent number, with them separated by a colon (:). Also, similarly to the case of FIG. 7, the left end and right end of the quadrangle indicating the allocation information of the extent respectively indicate the start logical block number and end logical block number in which the extent is recorded on the optical disk 3. In FIG. 19, the left end of the third row of the quadrangle indicating the allocation information of the extent indicates a parenthesized start file time code representing a playback time at which the start data of the extent must be played back.

For example, when the FTC sorting result is stored in the FTC sort result queue 44, and the schedule window is set in three extents (V1:Ext1, A1:Ext1, A2:Ext1) from the extent V1:Ext1 to the extent A2:Ext1, and an extent whose end logical block number is 160 is already stored in the scheduling result queue 46, as FIG. 20 shows, the LBN scheduling unit 45 moves the extent A1:Ext1 from the FTC sort result queue 44 to the end of the scheduling result queue 46.

In other words, in the case shown in FIG. 20, the scheduling result queue 46 is not empty (step S33 to step S37), and the schedule window does not include an extent whose start logical block number is greater than 106 as the end logical block number of the extent at the end of the scheduling result queue 46 (step S37 to step S34). Thus, among three extents V1:Ext1, A1:Ext1, and A2:Ext1, the extent A1:Ext1, which has the least start logical block number of 100, is detected (step S34), and is moved from the FTC sort result queue 44 to the end of the scheduling result queue 46 (step S35).

The present invention may be applied, not only optical disks, but also to, for example, recording media such as magnetic disks.

Although, in this embodiment, the reading of data from the optical disk 3, which contains video data and audio data, is scheduled, the present invention may be applied to playback of data from the optical disk 3 when it contains one of video data and audio data, data other than the video data and the audio data, and arbitrary type of data.

What is claimed is:

1. An information processing apparatus for scheduling order of data reading from a recording medium, comprising:
   first sorting means for sorting data items recorded on the recording medium based on playback times of the data items, the first sorting means comprising (i) first detecting means for detecting, from data items which have not been moved yet to a first queue among the data items recorded on the recording medium, a data item having earliest playback time, and (ii) first moving means for moving and storing the data item detected by the first detecting means in the first queue; and
   second sorting means for sorting the data items sorted by the first sorting means based on recording positions of the data items on the recording medium, and using the sorting result as a result of scheduling the order of data reading from the recording medium, the second sorting means comprising (i) setting means for setting a schedule window corresponding to a range of the data items stored in the first queue, the range of the data items being subject to sorting based on the recording positions of the data items on the recording medium, (ii) second detecting means for detecting, based on the recording positions of the data items on the recording medium, from the range of the data items in the schedule window, a data item to be moved to a second queue, (iii) second moving means for moving the data item detected by the second detecting means to the second queue (iv) first determination means for determining whether or not the second queue is empty, and (v) second determination means for determining whether or not the range of the data items in the schedule window includes a data item recorded behind the recording position on the recording medium of the end data item of the second queue; and wherein:

when the second queue is empty, the second detecting means detects, from the range of the data items in the schedule window, a data item which has an initial recording position on the recording medium;

when the second queue is not empty, and the range of the data items in the schedule window does not include a data item recorded behind the recording position on the recording medium of the end data item of the second queue, the second detecting means detects, from the range of the data items in the schedule window, a data item which has an initial recording position on the recording medium; and when the second queue is not empty, and the range of the data items in the schedule window includes a data item which is recorded behind the recording position on the recording medium of the end data item of the second queue, the second detecting means detects, from the range of the data items in the schedule window, a data item which is recorded behind the recording position on the recording medium of the end data item of the second queue and which is closest to the recording position on the recording medium of the end data item of the second queue.

2. An information processing apparatus according to claim 1, wherein at least one of video data and audio data is recorded in predetermined units on the recording medium.

3. An information processing apparatus according to claim 2, wherein the video data and the audio data in the predetermined units are alternately recorded on the recording medium.

4. An information processing apparatus according to claim 1, wherein:

the second sorting means further comprises third determination means for determining whether or not the data item moved to the second queue has been positioned at the start of the schedule window; and when the data item moved to the second queue has been positioned at the start of the schedule window, the setting means resets the schedule window.

5. An information processing method for scheduling order of data reading from a recording medium, comprising:

a first sorting step for sorting data items recorded on the recording medium based on playback times of the data items, the first sorting step comprising a first detecting step for detecting, from data items which have not been moved to a first queue among the data items recorded on the recording medium, a data item having earliest playback time, and (ii) a first moving step for moving and storing the data item detected in the first detecting step in the first queue; and a second sorting step for sorting, based on recording positions of the data items on the recording medium, the data items sorted based on the playback times thereof in the first sorting step, and using the sorting result as a result of scheduling the order of data reading from the recording medium, the second sorting step comprising (i) a setting step for setting a schedule window corresponding to a range of the data items stored in the first queue, the range of the data items being subject to sorting based on the recording positions of the data items on the recording medium, (ii) a second detecting step for detecting, based on the recording positions of the data items on the recording medium, from the range of the data items in the schedule window, a data item to be moved to a second queue, (iii) a second moving step for moving the data item detected in the second detecting step to the second queue, (iv) a first determination step for determining whether or not the second queue is empty, and (v) a second determination step for determining whether or not the range of the data items in the schedule window includes a data item recorded behind the recording position on the recording medium of the end data item of the second queue; and wherein:

when the second queue is empty, from the range of the data items in the schedule window, a data item which has an initial recording position on the recording medium is detected in the second detecting step;

when the second queue is not empty, and the range of the data items in the schedule window does not include a data item recorded behind the recording position on the recording medium of the end data item of the second queue, from the range of the data items in the schedule window, a data item which has an initial recording position is detected in the second detecting step; and when the second queue is not empty, and the range of the data items in the schedule window includes a data item recorded behind the recording position on the recording medium of the end data item of the second queue, in the second detecting step, from the range of the data items in the schedule window, a data item is detected which is recorded behind the recording position on the recording medium of the end data item of the second queue and which is closest to the recording position on the recording medium of the end data item of the second queue.

6. An information processing method according to claim 5, wherein at least one of video data and audio data is recorded in predetermined units on the recording medium.

7. An information processing method according to claim 6, wherein the video data and the audio data in the predetermined units are alternately recorded on the recording medium.

8. An information processing method according to claim 5, wherein:

the sorting step further comprises a third determination step for determining whether or not the data item moved to the second queue has been positioned at the start of the schedule window; and when the data item moved to the second queue has been positioned at the start of the schedule window, in the setting step, the schedule window is reset.

9. A computer readable medium having a program embodied therein, the program for causing a computer to perform an information processing method for scheduling order of data reading from a recording medium, the information processing method comprising:
  a first sorting step for sorting data items recorded on the recording medium based on playback times of the data items, the first sorting step comprising (i) a first detecting step for detecting, from data items which have not been moved to a first queue among the data items recorded on the recording medium, a data item having earliest playback time, and (ii) a first moving step for moving and storing the data item detected in the first detecting step in the first queue; and
  a second sorting step for sorting, based on recording positions of the data items on the recording medium, the data items sorted based on the playback times thereof in the first sorting step, and using the sorting result as a result of scheduling the order of data reading from the recording medium, the second sorting step comprising (i) a setting step for setting a schedule window corresponding to a range of the data items stored in the first queue, the range of the data items being subject to sorting based on the recording positions of the data items on the recording medium, (ii) a second detecting step for detecting, based on the recording positions of the data items on the recording medium, from the range of the data items in the schedule window, a data item to be moved to a second queue, (iii) a second moving step for moving the data item detected in the second detecting step to the second queue, (iv) a first determination step for determining whether or not the second queue is empty, and ('v) a second determination step for determining whether or not the range of the data items in the schedule window includes a data item recorded behind the recording position on the recording medium of the end data item of the second queue; and wherein:
  when the second queue is empty, from the range of the data items in the schedule window, a data item which has an initial recording position on the recording medium is detected in the second detecting step;
  when the second queue is not empty, and the range of the data items in the schedule window does not include a data item which is recorded behind the recording position on the recording medium of the end data item of the second queue, from the range of the data items in the schedule window, a data item which has an initial recording position is detected in the second detecting step; and
  when the second queue is not empty, and the range of the data items in the schedule window includes a data item recorded behind the recording position on the recording medium of the end data item of the second queue, in the second detecting step, from the range of the data items in the schedule window, a data item is detected which is recorded behind the recording position on the recording medium of the end data item of the second queue and which is closest to the recording position on the recording medium of the end data item of the second queue.

10. The computer readable medium according to claim 9, wherein at least one of video data and audio data is recorded in predetermined units on the recording medium.

11. The computer readable medium according to claim 10, wherein the video data and the audio data in the predetermined units are alternately recorded on the recording medium.

12. The computer readable medium according to claim 9, wherein: the sorting step further comprises a third determination step for determining whether or not the data item moved to the second queue has been positioned at the start of the schedule window; and
  when the data item moved to the second queue has been positioned at the start of the schedule window, in the setting step, the schedule window is reset.

* * * * *